(12) United States Patent
Kajimoto et al.

(10) Patent No.: US 12,028,489 B2
(45) Date of Patent: Jul. 2, 2024

(54) SCANNING APPARATUS AND IMAGE PROCESSING TECHNIQUE TO EASILY IDENTIFY A POST TO WHICH IMAGE DATA IS POSTED AS A REPLY TO A CHAT SERVICE

(71) Applicant: CANON KABUSHIKI KAISHA, Tokyo (JP)

(72) Inventors: Masahiro Kajimoto, Chiba (JP); Kenta Usami, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/457,165

(22) Filed: Aug. 28, 2023

(65) Prior Publication Data
US 2024/0073326 A1 Feb. 29, 2024

(30) Foreign Application Priority Data
Aug. 31, 2022 (JP) ................. 2022-137475

(51) Int. Cl.
*H04N 1/00* (2006.01)
*H04L 51/046* (2022.01)
*H04N 1/32* (2006.01)

(52) U.S. Cl.
CPC ....... *H04N 1/00209* (2013.01); *H04L 51/046* (2013.01); *H04N 1/00244* (2013.01); *H04N 1/32101* (2013.01); *H04N 2201/0094* (2013.01); *H04N 2201/3205* (2013.01)

(58) Field of Classification Search
CPC ........... H04N 1/00209; H04N 1/00244; H04N 1/32101; H04L 51/046
See application file for complete search history.

(56) References Cited

U.S. PATENT DOCUMENTS

| | | | | |
|---|---|---|---|---|
| 11,316,997 B2* | 4/2022 | Sugita | ..................... | H04L 51/10 |
| 11,716,434 B2* | 8/2023 | Osuki | ................ | H04N 1/32566 |
| | | | | 358/1.15 |
| 11,825,039 B2* | 11/2023 | Nishiyama | .............. | H04L 51/02 |
| 11,838,456 B2* | 12/2023 | Toda | ....................... | H04L 51/02 |
| 11,843,573 B2* | 12/2023 | Awatsu | ................. | H04L 51/216 |
| 11,909,927 B2* | 2/2024 | Ushinohama | ......... | H04L 51/046 |
| 2021/0195061 A1* | 6/2021 | Moriya | .............. | H04N 1/00811 |
| 2021/0250450 A1* | 8/2021 | Kawashima | .......... | H04L 51/046 |
| 2023/0056034 A1* | 2/2023 | Ushinohama | ......... | G06F 3/1206 |
| 2023/0105788 A1* | 4/2023 | Yamamoto | .............. | H04L 51/08 |
| | | | | 709/206 |
| 2023/0171471 A1* | 6/2023 | Tsukada | ................. | G06Q 50/10 |
| | | | | 709/204 |
| 2023/0362308 A1* | 11/2023 | Tsukada | ............. | H04N 1/00411 |

FOREIGN PATENT DOCUMENTS

JP  2021078084 A  5/2021

* cited by examiner

*Primary Examiner* — Scott A Rogers
(74) *Attorney, Agent, or Firm* — Canon U.S.A., Inc. IP Division

(57) ABSTRACT

A scanning apparatus includes a scanning unit configured to scan a document to generate image data, and a transmission unit configured to transmit, to a chat server, the image data generated by the scanning unit and identification information corresponding to a post selected as a post to which a reply is to be made. The image data transmitted by the transmission unit and the post corresponding to the identification information transmitted by the transmission unit are posted in association with each other to a talk room of a chat service provided by the chat server.

13 Claims, 17 Drawing Sheets

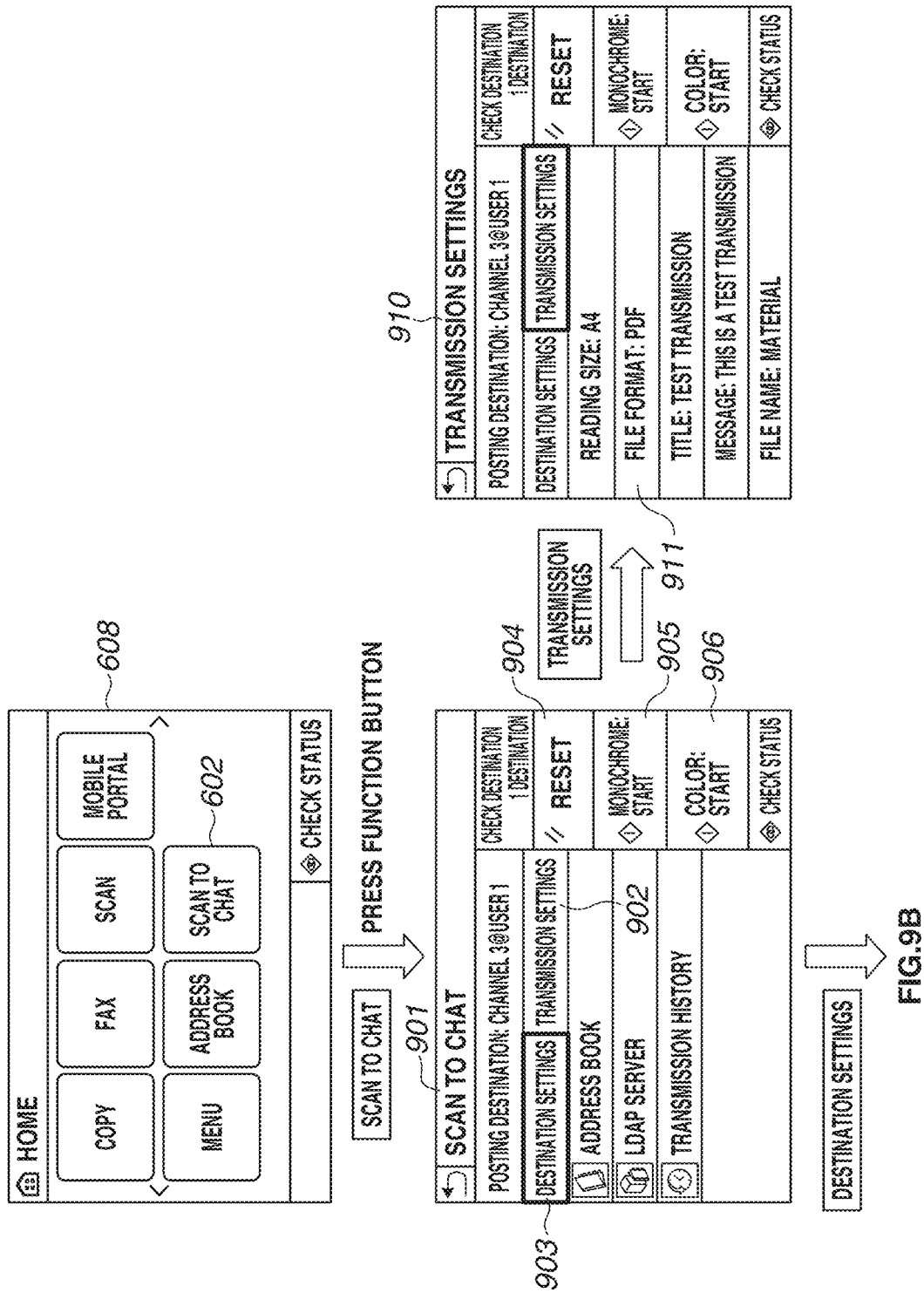

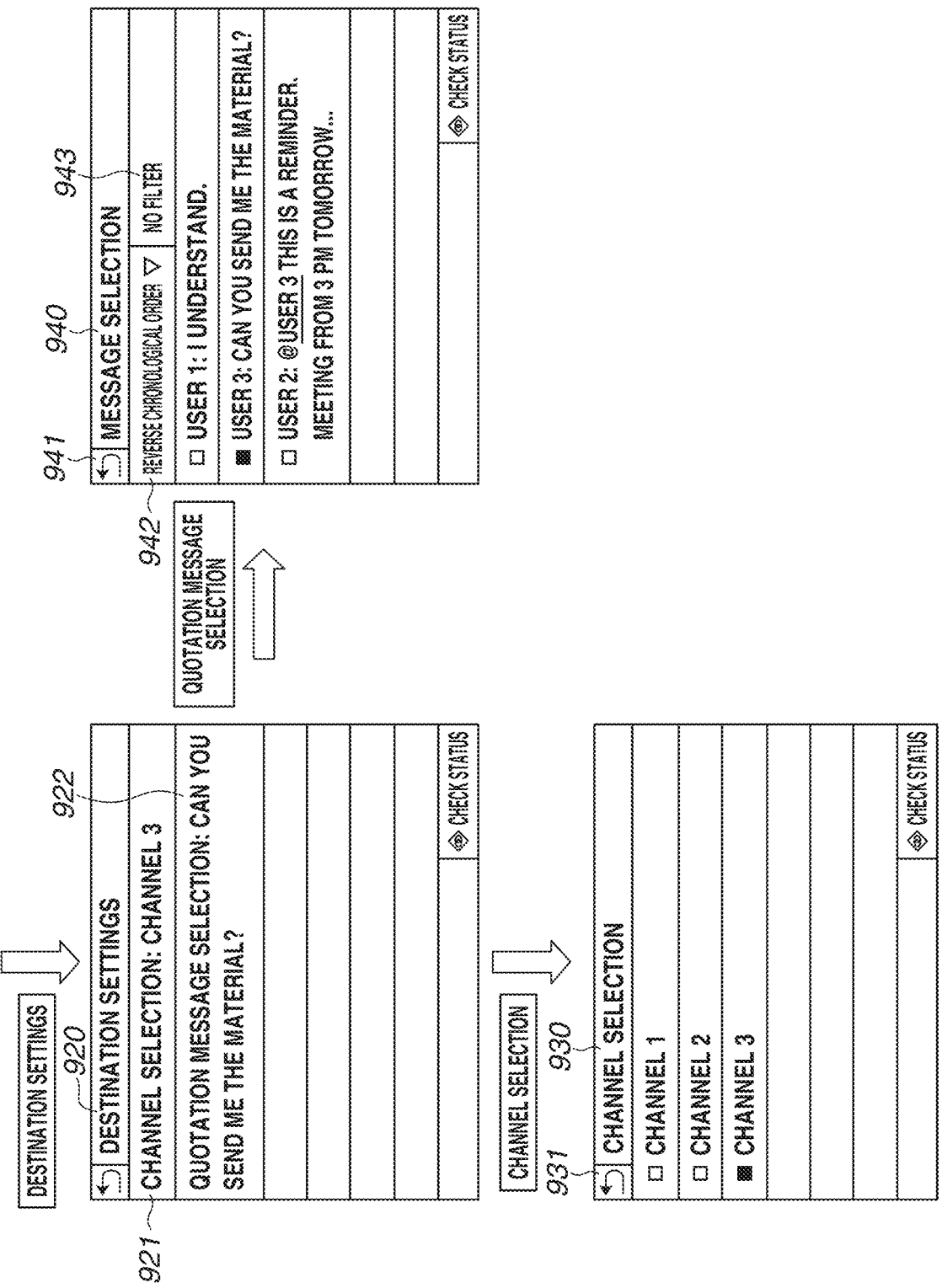

SCANNING APPARATUS AND IMAGE PROCESSING TECHNIQUE TO EASILY IDENTIFY A POST TO WHICH IMAGE DATA IS POSTED AS A REPLY TO A CHAT SERVICE

BACKGROUND OF THE DISCLOSURE

Field of the Disclosure

The present disclosure relates to a scanning apparatus, an image processing method, and a storage medium.

Description of the Related Art

Japanese Patent Application Laid-Open No. 2021-078084 discusses a technique for transmitting image data generated by scanning a document using an image processing apparatus to a message application server that provides a chat service. Consequently, the image data is uploaded to a channel of the chat service and shared.

In a case where image data generated by scanning a document using a scanning apparatus is posted as a reply to a message posted to the channel of the chat service, the technique discussed in Japanese Patent Application Laid-Open No. 2021-078084 may find it difficult to identify to which post the reply is made if another post is posted between the post to which the reply is made and the post as the reply.

SUMMARY OF THE DISCLOSURE

The present disclosure is directed to a technique making it easy to identify, in a case where image data generated by scanning a document using a scanning apparatus is posted as a reply to a chat service, a post to which the reply is made.

According to an aspect of the present disclosure, a scanning apparatus includes a scanning unit configured to scan a document to generate image data, and a transmission unit configured to transmit, to a chat server, the image data generated by the scanning unit and identification information corresponding to a post selected as a post to which a reply is to be made. The image data transmitted by the transmission unit and the post corresponding to the identification information transmitted by the transmission unit are posted in association with each other to a talk room of a chat service provided by the chat server.

Further features of the present disclosure will become apparent from the following description of exemplary embodiments with reference to the attached drawings.

BRIEF DESCRIPTION OF THE DRAWINGS

FIGS. 9A and 9B are a diagram illustrating an example of a screen transition in the scan-to-chat processing.

DESCRIPTION OF THE EMBODIMENTS

Exemplary embodiments of the present disclosure will be described below with reference to the drawings. Configurations illustrated in the following exemplary embodiments are merely examples, and the present disclosure is not limited to the illustrated configurations.

Figure 1:
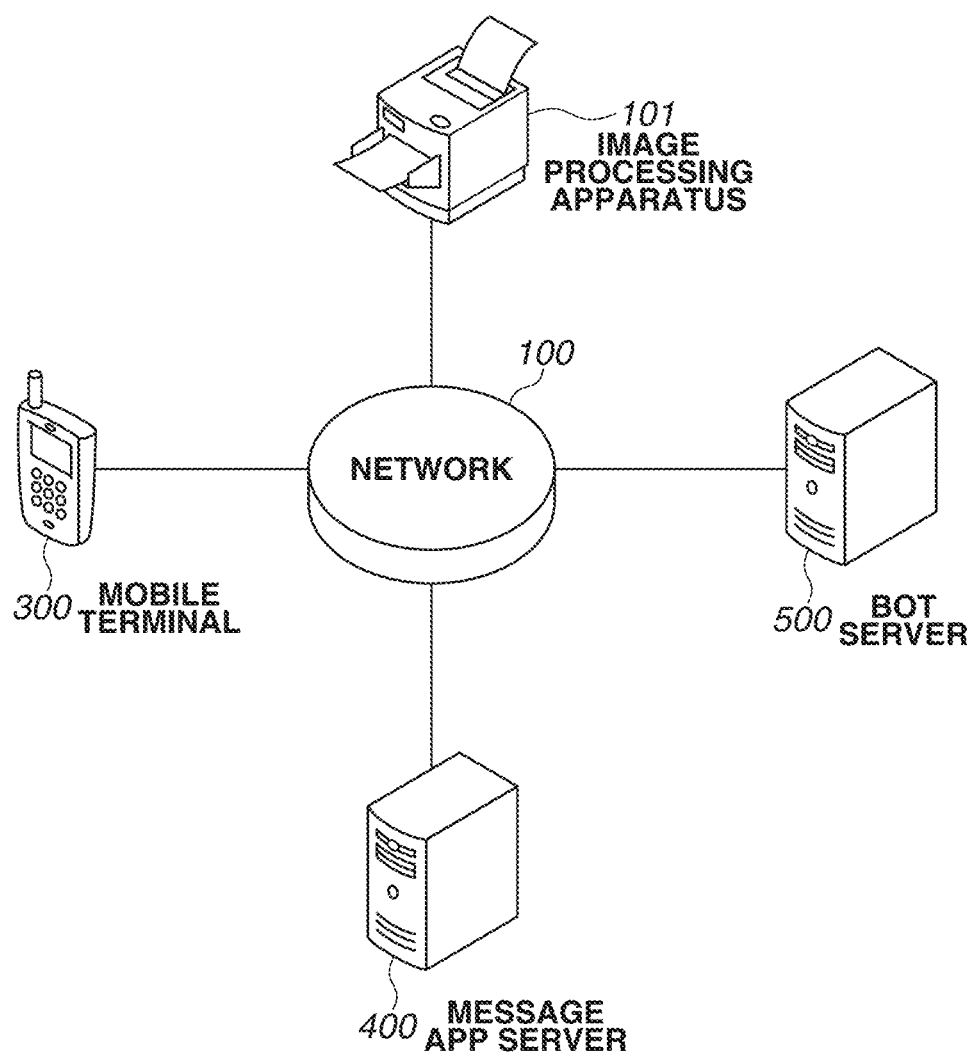
FIG. 1 is a diagram illustrating an example of a system configuration according to an exemplary embodiment of the present disclosure.

FIG. 1 is a diagram illustrating an example of a system configuration according to a first exemplary embodiment of the present disclosure. The system configuration according to the present exemplary embodiment includes a mobile terminal 300, which is an example of a terminal apparatus, an image processing apparatus 101, and a message application (app) server 400, which can communicate with each other via a network 100. A bot server 500 is also connected to these apparatuses via the network 100 and can communicate with the apparatuses. The message app server 400 is a chat server that manages and provides a chat service that receives messages and image data transmitted from the image processing apparatus 101 or the mobile terminal 300 and displays the messages and the image data on the mobile terminal 300 or a personal computer (PC) (not illustrated) based on a user operation. The bot server 500 associates a request from the image processing apparatus 101 with information (token information) corresponding to a bot app installed on the message app server 400 connected to the image processing apparatus 101, and transfers the request to the message app server 400. The network 100 according to the present exemplary embodiment may be the Internet, or may be a local area network (LAN). The network 100 may be wired or wireless.

Figure 2:
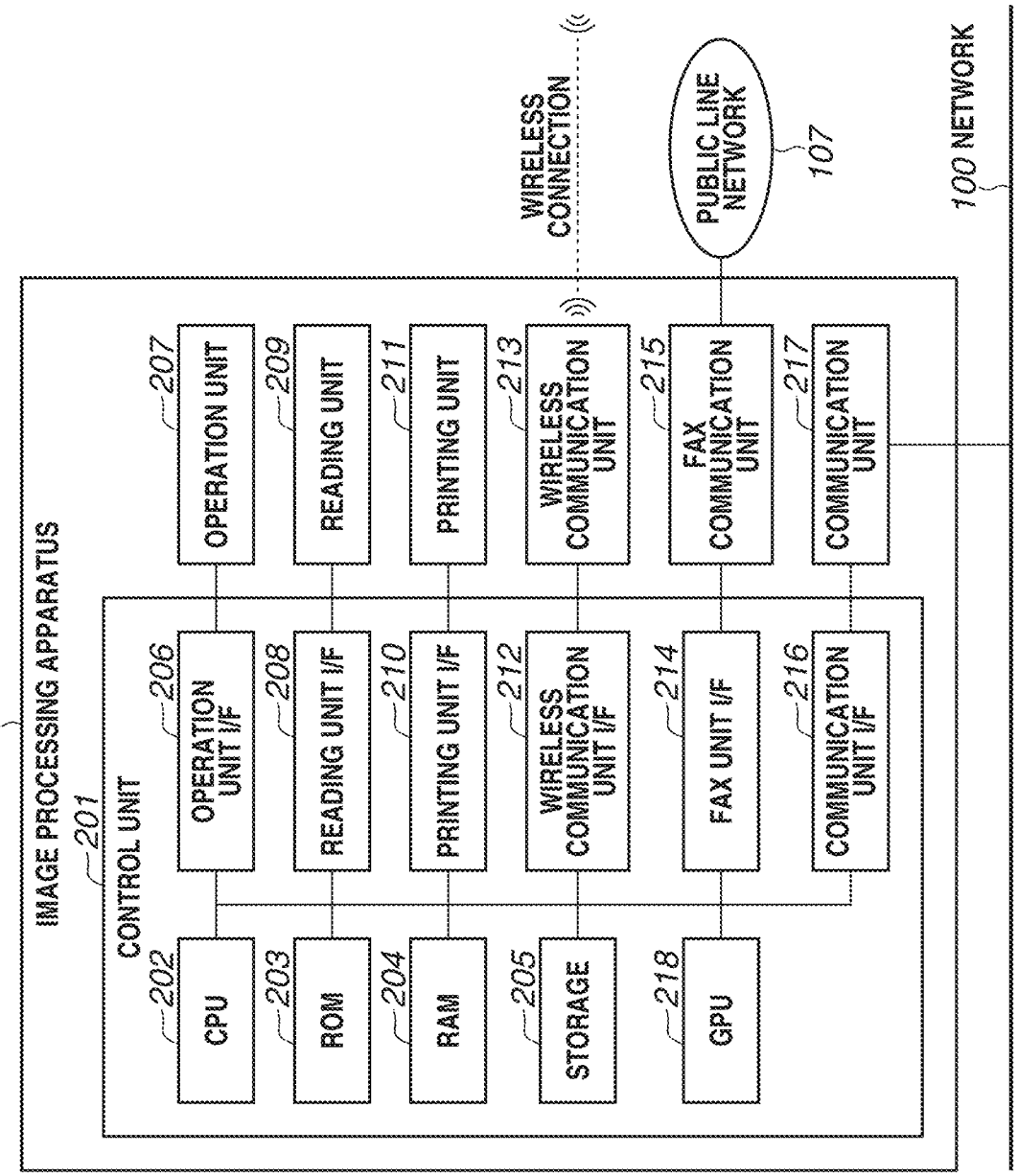
FIG. 2 is a diagram illustrating an example of a hardware configuration of an image processing apparatus.

FIG. 2 is a block diagram illustrating an example of a hardware configuration of the image processing apparatus 101.

In FIG. 2, a multifunction peripheral having a print function, a scanner function, and a data communication function is illustrated as an example of the image processing apparatus 101.

Alternatively, the image processing apparatus 101 may be a scanning apparatus.

The image processing apparatus 101 includes a central processing unit (CPU) 202, a read-only memory (ROM)

203, a random-access memory (RAM) 204, a storage 205, an operation unit interface (I/F) 206, an operation unit 207, a reading unit OF 208, a reading unit 209, a printing unit OF 210, a printing unit 211, a wireless communication unit OF 212, and a wireless communication unit 213. The image processing apparatus 101 also includes a facsimile (fax) unit OF 214, a fax communication unit 215, a communication unit OF 216, and a communication unit 217.

A control unit 201 including the CPU 202 controls an entire operation of the image processing apparatus 101. The CPU 202 loads control programs stored in the ROM 203 or the storage 205 into the RAM 204 and performs various types of control such as reading control and print control. The ROM 203 stores the control programs that can be executed by the CPU 202. The ROM 203 also stores a boot program and font data. The RAM 204 is a main storage memory and is used as a work area or a temporary storage area into which various control programs stored in the ROM 203 and the storage 205 are to be loaded. The storage 205 stores image data, print data, various programs, and various pieces of setting information. While a flash memory is assumed to be used as the storage 205 in the present exemplary embodiment, an auxiliary storage device such as a solid-state drive (SSD) or a hard disk drive (HDD) may be used as the storage 205. Alternatively, an embedded MultiMediaCard (eMMC) may be used as the storage 205.

In the image processing apparatus 101 according to the present exemplary embodiment, one CPU 202 uses one memory (one RAM 204) to perform each processing in flowcharts to be described below. The present exemplary embodiment, however, is not limited thereto. For example, a plurality of CPUs, RAMs, ROMs, and storages can cooperate to perform each processing in the flowcharts to be described below. Alternatively, some of the processing may be performed using a hardware circuit such as an application-specific integrated circuit (ASIC) or a field-programmable gate array (FPGA).

The operation unit OF 206 connects the operation unit 207 to the control unit 201. The operation unit 207 includes a display unit, such as a touch panel, and a hardware key. The operation unit 207 displays information to a user and detects an input from the user.

The reading unit OF 208 connects the reading unit 209, such as a scanner, to the control unit 201. The reading unit 209 reads an image of a document, and the CPU 202 converts the read image into image data such as binary data. The image data generated based on the image read by the reading unit 209 is transmitted to an external apparatus or printed on a recording sheet. The reading unit 209 serving as a scanning unit can also scan a plurality of sheets of a document placed on an auto document feeder (ADF) (not illustrated) to generate a plurality of pieces of image data. The document placed on the ADF at this time is conveyed by the ADF and scanned.

The printing unit OF 210 connects the printing unit 211, such as a printer, to the control unit 201. The CPU 202 transfers image data (print data) stored in the RAM 204 to the printing unit 211 via the printing unit OF 210. The printing unit 211 prints an image based on the transferred image data on a recording sheet fed from a sheet feeding cassette (not illustrated).

The wireless communication unit OF 212 is used to control the wireless communication unit 213, and wirelessly connects the control unit 201 and an external wireless device (the mobile terminal 300 in the present exemplary embodiment).

The control unit 201 is connected to a public line network 107 by the fax unit OF 214 controlling the fax communication unit 215 such as a facsimile machine. The fax unit I/F 214 is used to control the fax communication unit 215. The fax unit OF 214 controls a facsimile communication modem and a network control unit (NCU) and thereby can perform the connection to the public line network 107 and the control of a facsimile communication protocol.

The communication unit OF 216 connects the control unit 201 and the network 100. Through the communication unit OF 216, the communication unit 217 transmits image data and various pieces of information in the image processing apparatus 101 to an external apparatus on the network 100, and also receives print data and information on the network 100 from an information processing apparatus on the network 100. As the transmission and reception method via the network 100, transmission and reception using electronic mail (email), or file transmission using another protocol (e.g., File Transfer Protocol (FTP), Server Message Block (SMB), or web Distributed Authoring and Versioning (web-DAV)) can be used. Image data and various pieces of setting data can also be transmitted and received via the network 100 by access from the mobile terminal 300, the message app server 400, or the bot server 500 using Hypertext Transfer Protocol (HTTP) communication.

Figure 3:
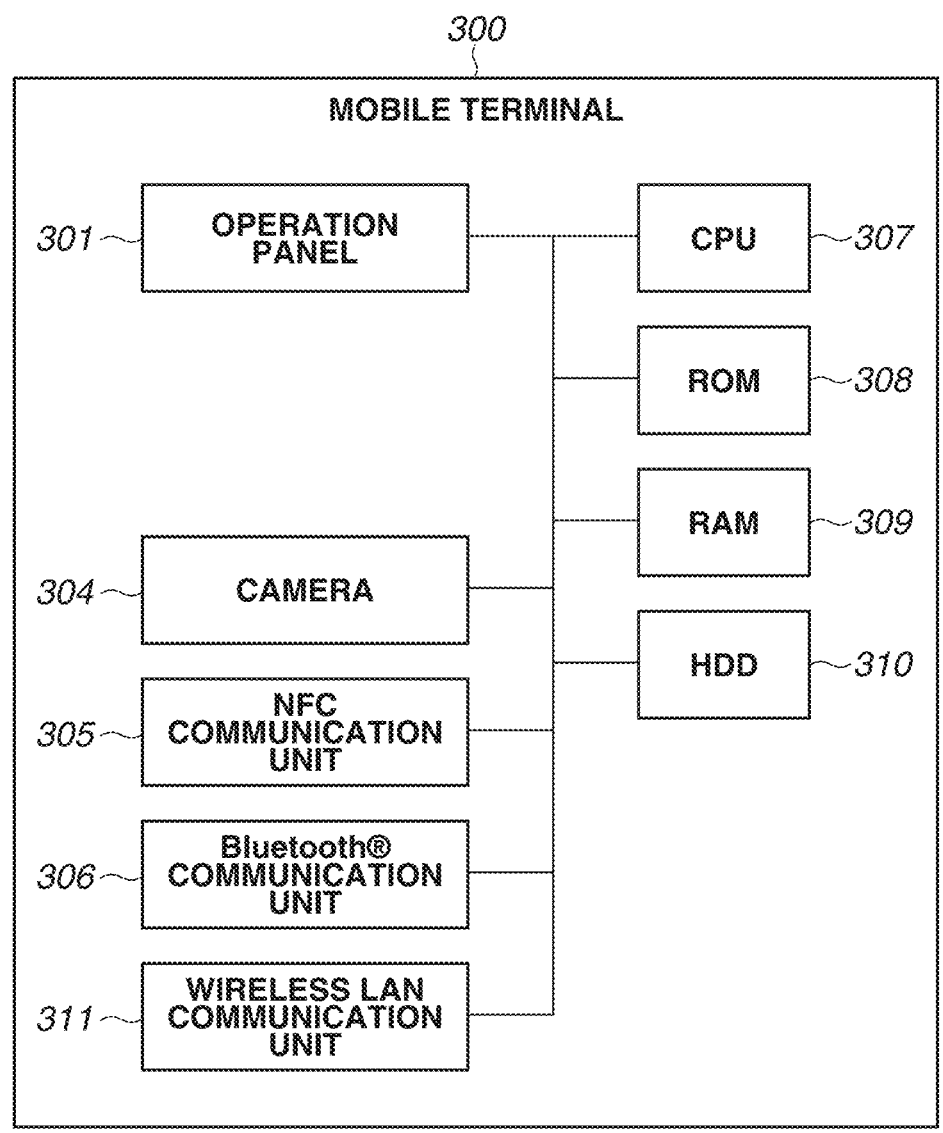
FIG. 3 is a diagram illustrating an example of a hardware configuration of a mobile terminal.

FIG. 3 is a diagram illustrating an example of a hardware configuration of the mobile terminal 300. While an apparatus, such as a smartphone or a tablet PC, is assumed to be used as the mobile terminal 300 according to the present exemplary embodiment, another apparatus may be used as long as the apparatus is an information processing apparatus capable of performing Wi-Fi® communication.

A CPU 307 reads control programs stored in a ROM 308 and performs various types of processing for controlling the operation of the mobile terminal 300. The ROM 308 stores the control programs. A RAM 309 is used as a temporary storage area, such as a main memory or a work area, for the CPU 307. An HDD 310 stores various pieces of data such as pictures and electronic documents.

An operation panel 301 has a touch panel function capable of detecting a touch operation of the user and displays various screens provided by an operating system (OS) and an email transmission application. The operation panel 301 is also used to check information stored in the message app server 400. The user inputs a touch operation to the operation panel 301 and thereby can input a desired operation instruction to the mobile terminal 300. The mobile terminal 300 includes a hardware key (not illustrated), and the user can input an operation instruction to the mobile terminal 300 using the hardware key.

A camera 304 captures an image based on an image capturing instruction from the user. The image captured by the camera 304 is stored in a predetermined area of the HDD 310. Using a program capable of analyzing a Quick Response (QR) Code®, information can also be acquired from the QR Code® read by the camera 304.

The mobile terminal 300 can transmit and receive data to and from various peripheral devices via a near-field communication (NFC) communication unit 305, a Bluetooth® communication unit 306, and a wireless LAN communication unit 311. The Bluetooth® communication unit 306 of the mobile terminal 300 may be compatible with Bluetooth® Low Energy.

Figure 4:
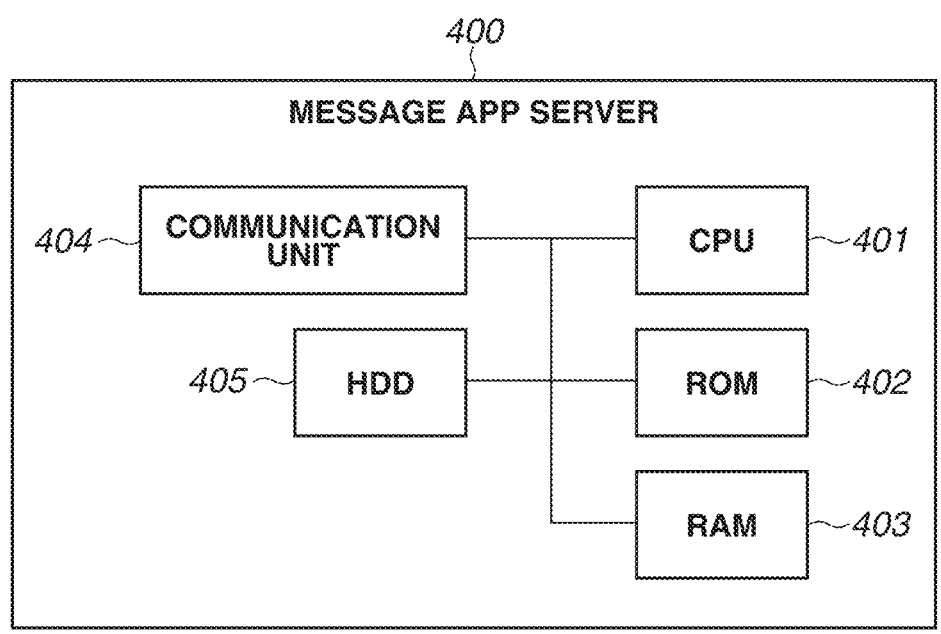
FIG. 4 is a diagram illustrating an example of a hardware configuration of a message application server.

FIG. 4 is a diagram illustrating an example of a hardware configuration of the message app server 400. A CPU 401 reads control programs stored in a ROM 402 and performs various types of processing for controlling the operation of the message app server 400. The ROM 402 stores the control programs. A RAM 403 is used as a temporary storage area, such as a main memory or a work area, for the CPU 401. An HDD 405 stores various pieces of data such as messages, image data, and channel information. The HDD 405 can transmit and receive data to and from various apparatuses, such as the mobile terminal 300, the image processing apparatus 101, and the bot server 500, via a communication unit 404. The communication unit 404 may perform wired communication using Ethernet®, or may perform wireless communication using Wi-Fi®.

Figure 5:
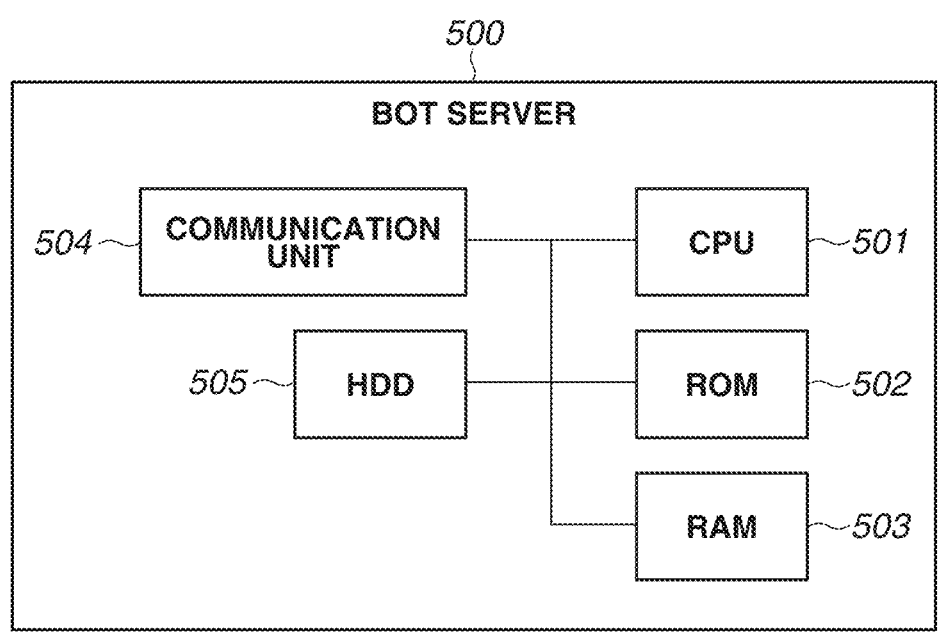
FIG. 5 is a diagram illustrating an example of a hardware configuration of a bot server.

FIG. 5 is a diagram illustrating an example of a hardware configuration of the bot server 500. A CPU 501 reads control programs stored in a ROM 502 and controls the operation of the bot server 500 to perform various types of processing for mediating between the image processing apparatus 101 and the message app server 400 based on requests from the image processing apparatus 101. The ROM 502 stores the control programs. A RAM 503 is used as a temporary storage area, such as a main memory or a work area, for the CPU 501. An HDD 505 stores various pieces of data such as messages, image data, and channel information. The HDD 505 can transmit and receive data to and from various apparatuses, such as the mobile terminal 300, the image processing apparatus 101, and the message app server 400, via a communication unit 504.

Figure 6:
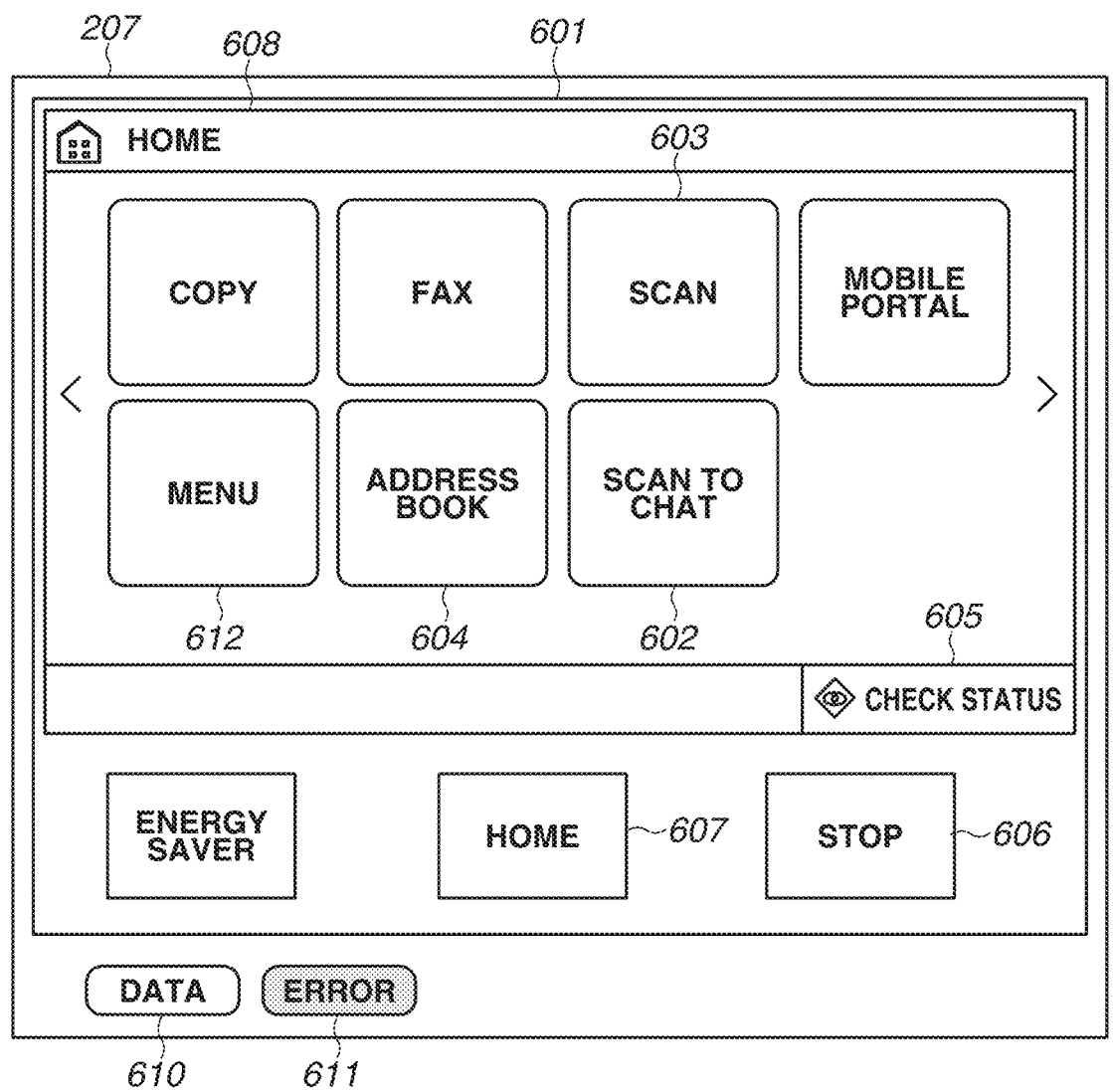
FIG. 6 is a diagram illustrating an example of a home screen displayed on an operation unit of the image processing apparatus.

FIG. 6 is a diagram illustrating an example of a home screen displayed on the operation unit 207 of the image processing apparatus 101. The operation unit 207 includes a touch panel 601 that displays an operation screen, and light-emitting diodes (LEDs) 610 and 611. The touch panel 601 is an instruction unit. The touch panel 601 functions as a reception unit that receives an instruction from the user, and also functions as a display unit that displays a screen. The user directly touches the screen displayed on the touch panel 601 with a finger or an object such as a stylus, thereby giving an instruction to perform any of functions based on the displayed screen.

The touch panel 601 illustrated in FIG. 6 displays a HOME screen 608. The HOME screen 608 is an initial screen for giving an instruction to perform any of the functions of the image processing apparatus 101, and is used to select a screen for making settings for any of the functions, such as a copy function, a fax function, a scan function, and a media print function, of the image processing apparatus 101.

A CHECK STATUS button 605 is an object for displaying a screen (a status check screen) for checking the status of the image processing apparatus 101. The status check screen (not illustrated) enables displaying a transmission history and a job execution history.

A SCAN TO CHAT button 602 is an object for displaying a settings screen for scan-to-chat processing. When the SCAN TO CHAT button 602 is selected by the user, a SCAN TO CHAT screen 901 in FIG. 9A is displayed on the operation unit 207. The scan-to-chat processing will be described in detail below with reference to FIGS. 7, 8A and 8B.

A SCAN button 603 is an object for displaying a scan selection screen (not illustrated) of the image processing apparatus 101. The scan selection screen is used to select a transmission function, such as email transmission, file transmission using SMB, FTP, or HTTP, or Internet fax (I-fax) transmission. When an object indicating a transmission function is touched on the scan selection screen, a settings screen for the corresponding transmission function is displayed.

An ADDRESS BOOK button 604 is an object for displaying, when selected by the user, an address book screen of the image processing apparatus 101. The LEDs 610 and 611 are used to notify the user of the status of the image processing apparatus 101. The LED 610 lights up during the reception of an email or a print job, or the execution of a print job. The LED 611 lights up if some sort of error occurs in the image processing apparatus 101. A STOP button 606 is an object for canceling various operations and is constantly displayed on the operation unit 207. A HOME button 607 is an object for displaying the HOME screen 608 and is constantly displayed on the operation unit 207. A MENU button 612 is an object for displaying a screen for making an environment setting such as a language and setting each function.

Figure 7:
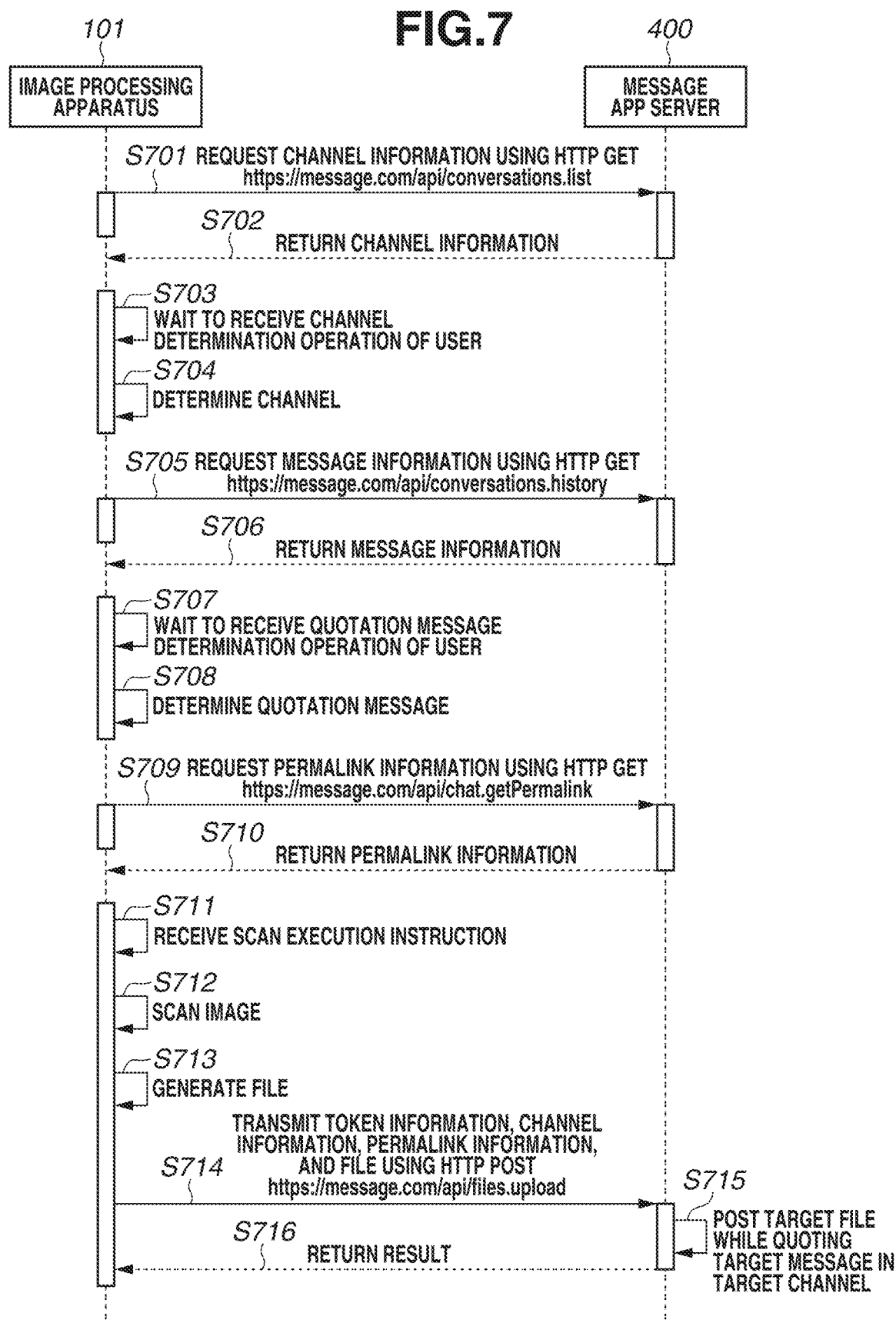
FIG. 7 is a diagram illustrating an example of a sequence where the image processing apparatus transmits a file generated by a scan to the message application server.

FIG. 7 is a diagram illustrating an example of a sequence where the image processing apparatus 101 transmits a file generated by a scan to the message app server 400. The sequence in FIG. 7 is started when a DESTINATION SETTINGS button 903 on the SCAN TO CHAT screen 901 in FIG. 9A is selected.

In step S701, the CPU 202 of the image processing apparatus 101 controls the communication unit 217 to transmit a request for channel information to the message app server 400 through HTTP communication. More specifically, the CPU 202 of the image processing apparatus 101 transmits, to the message app server 400, token information input to the image processing apparatus 101, and information indicating a request for channel information in a work space indicated by the token information. At this time, the CPU 202 of the image processing apparatus 101 transmits user identifier (ID) information input to the image processing apparatus 101 to the message app server 400, whereby the message app server 400 identifies information related to the user ID in the work space.

In a case where only an individual user is allowed to read and write user information in the work space, the CPU 202 of the image processing apparatus 101 transmits password information corresponding to the user ID information input to the image processing apparatus 101 to the message app server 400, whereby the message app server 400 acquires authority to read and write the user information in the work space.

An example of a command transmitted at this time is "HTTP GET https://message.com/api/conversations.list". The Uniform Resource Locator (URL) "https://message.com/api/conversations.list" described in this command is a URL for accessing the message app server 400. The token information is transmitted to this URL, whereby the message app server 400 searches for a channel associated with the work space corresponding to the token information and the user. The token information is input by the user through a SETTING REGISTRATION screen 1001 in FIG. 10 displayed on the operation unit 207 of the image processing apparatus 101.

The term "work space" here refers to a kind of organization to which a plurality of users belongs in a message app, and is also referred to as a "team". The term "channel" is synonymous with a "chat room" in the work space. The chat room is a mechanism for a plurality of users participating in the chat room to exchange messages with each other and interact with each other like a conversation. While the present exemplary embodiment is described on the assumption that a channel is a chat room, the present exemplary embodiment is not limited thereto as long as a channel is a mechanism for a plurality of users to exchange messages with each other and interact with each other like a conversation. For example, a channel may be a group chat, a room, a talk room, or a group.

In step S702, based on the token information and the user ID received from the image processing apparatus 101 via the communication unit 404, the CPU 401 of the message app server 400 determines whether access to the URL is permitted. If access to the URL is permitted, the CPU 401 of the message app server 400 returns, to the image processing apparatus 101, channel information included in the work space corresponding to the token information. The image processing apparatus 101 displays, on the operation unit 207, the channel information received in step S702.

In step S703, the CPU 202 of the image processing apparatus 101 waits for a channel determination operation of the user. In step S704, the user determines a channel.

In step S705, based on channel information regarding the channel determined in step S704, the CPU 202 of the image processing apparatus 101 transmits a request for message information in the channel to the message app server 400. An example of a command transmitted at this time is "HTTP GET https://message.com/api/conversations.history". The channel information is transmitted to this URL, whereby the message app server 400 searches for a message corresponding to the channel information.

In step S706, the CPU 401 of the message app server 400 returns, to the image processing apparatus 101, the message information in the channel. The image processing apparatus 101 displays, on the operation unit 207, the message information received in step S706.

In step S707, the CPU 202 of the image processing apparatus 101 waits for a quotation message determination operation of the user. In step S708, the user determines a quotation message. At this time, a plurality of quotation messages can also be selected. The term "quotation message" refers to a message (a post) to which a reply is to be made when the user posts, as the reply, image data generated by scanning a document using a scanning apparatus. Quoting the message (the post) enables a user viewing the post to easily identify to which post the reply is made.

In step S709, based on identification information regarding the quotation message determined in step S708, the CPU 202 of the image processing apparatus 101 transmits a request for a permalink to the message to the message app server 400. An example of a command transmitted at this time is "HTTP GET https://message.com/api/chat.getPermalink". Message information (e.g., a time stamp) is transmitted to this URL, whereby the message app server 400 searches for the permalink to the target message. If a plurality of quotation messages is present, the CPU 202 of the image processing apparatus 101 transmits a request for permalinks to the plurality of quotation messages to the message app server 400. Alternatively, the acquisition of the permalink may be omitted. In this case, in step S714, the image processing apparatus 101 transmits image data and the identification information regarding the message (the post) to the message app server 400. Then, in step S715, based on the received identification information regarding the message (the post), the message app server 400 identifies the message to be quoted and posts the image data. In other words, even if the permalink is not acquired, the same result as that in the processing of step S715 (described below) is obtained.

In step S710, the CPU 401 of the message app server 400 returns the permalink to the target message to the image processing apparatus 101.

In step S711, the CPU 202 of the image processing apparatus 101 receives a scan execution instruction through the operation unit 207.

In step S712, based on the scan execution instruction and scan settings made by the user, the CPU 202 of the image processing apparatus 101 scans an image of a document.

In step S713, the CPU 202 of the image processing apparatus 101 generates, from the scanned image, image data in a format set in the scan settings. As the scan settings, scan settings specified by the user on an advanced settings screen (not illustrated) for the scan-to-chat processing are used. Alternatively, scan settings may be displayed together with transmission settings on a TRANSMISSION SETTINGS screen 910 in FIG. 9A and set.

In step S714, the CPU 202 of the image processing apparatus 101 transmits the same token information as that in step S701 and the information regarding the posting destination channel selected in step S704 to the message app server 400 via the communication unit 217 through HTTP communication. The CPU 202 of the image processing apparatus 101 also transmits permalink information regarding the permalink to the quotation message that is acquired in step S710 and the image file generated in step S713 through HTTP communication.

An example of a command transmitted at this time is "HTTP POST https://message.com/api/files.upload". As the file format, a file format 911 specified by the user on the TRANSMISSION SETTINGS screen 910 for the scan-to-chat processing is used. If a plurality of quotation messages is present, the CPU 202 of the image processing apparatus 101 collectively transmits pieces of permalink information regarding permalinks to the respective messages.

In step S715, the CPU 401 of the message app server 400 searches for work space information registered in the token information received in step S714 and stores the received image file and the channel specified by the channel information in association with each other. If the permalink to the quotation message is also received, the CPU 401 of the message app server 400 posts the received image data in association with the message (the post) corresponding to the permalink in the posting destination channel. If a plurality of quotation messages is present, the received image data is associated with the plurality of quotation messages. Consequently, when the user starts the message app on the mobile terminal 300 and selects the posting destination channel, a screen where the image file is posted while the selected message in the selected channel is quoted is displayed. The term "quotation" refers to the function of, when transmitting a chat message, clarifying that the chat message is a reply to a particular message in previous conversations. Examples of the quotation include a method of describing a text portion of a particular message in a post to be transmitted by the user, and a method of posting a post including information (e.g., a permalink, an ID, or a timestamp) enabling identification of a particular message. In the case of quoting a message using a permalink, the quoted original message can be directly referred to through the link. The displayed screen is a screen displayed on a display unit of a terminal accessing the message app server 400.

While a configuration in which a message is quoted by transmitting a permalink to the message in addition to the other information has been described in the present exemplary embodiment, a configuration may be employed in which a text portion of a selected message is extracted, and text data and image data are transmitted together to the message app server 400. At this time, the selected message is posted after the image processing apparatus 101 edits the text of the message using, for example, a symbol ">" so that the message can be identified as a quotation message. Alternatively, quoting a particular message may be requested by transmitting, to the message app server 400, not a permalink but a message ID or a timestamp as identification information for identifying a post selected as a post to which a reply is to be made. In such a case, steps S709 and S710, which are steps of acquiring a permalink, can be skipped. The message app server 400 searches for a message associated with the message ID or the timestamp received from the image processing apparatus 101 and newly posts a post including the post (the message) found in the search and image data generated by a scan. The post is displayed as illustrated in a message 1104 in FIG. 11. In a case where the image processing apparatus 101 transmits permalink information, the message app server 400 searches for a permalink to the message associated with the received message ID or timestamp. Then, the permalink found in the search is included in the post for the image data. The message is quoted in the form of another thread that is different from a thread collecting a series of conversations.

As described above, a message (a post) to which a reply is to be made and image data generated by a scan are posted in association with each other, whereby the user can easily identify to which post the reply is made.

In step S716, the CPU 401 of the message app server 400 transmits a result of whether the posting is successful to the image processing apparatus 101 as response information in HTTP communication. If the posting is successful, the CPU 202 of the image processing apparatus 101 may display, on the operation unit 207, a notification that the posting is successful. If the posting fails, the CPU 202 of the image processing apparatus 101 may display, on the operation unit 207, a notification that the posting fails. Alternatively, if the posting is successful, the CPU 202 of the image processing apparatus 101 may display no notification, and only if the posting fails, the CPU 202 of the image processing apparatus 101 may display a notification that the posting fails.

Figure 8A:
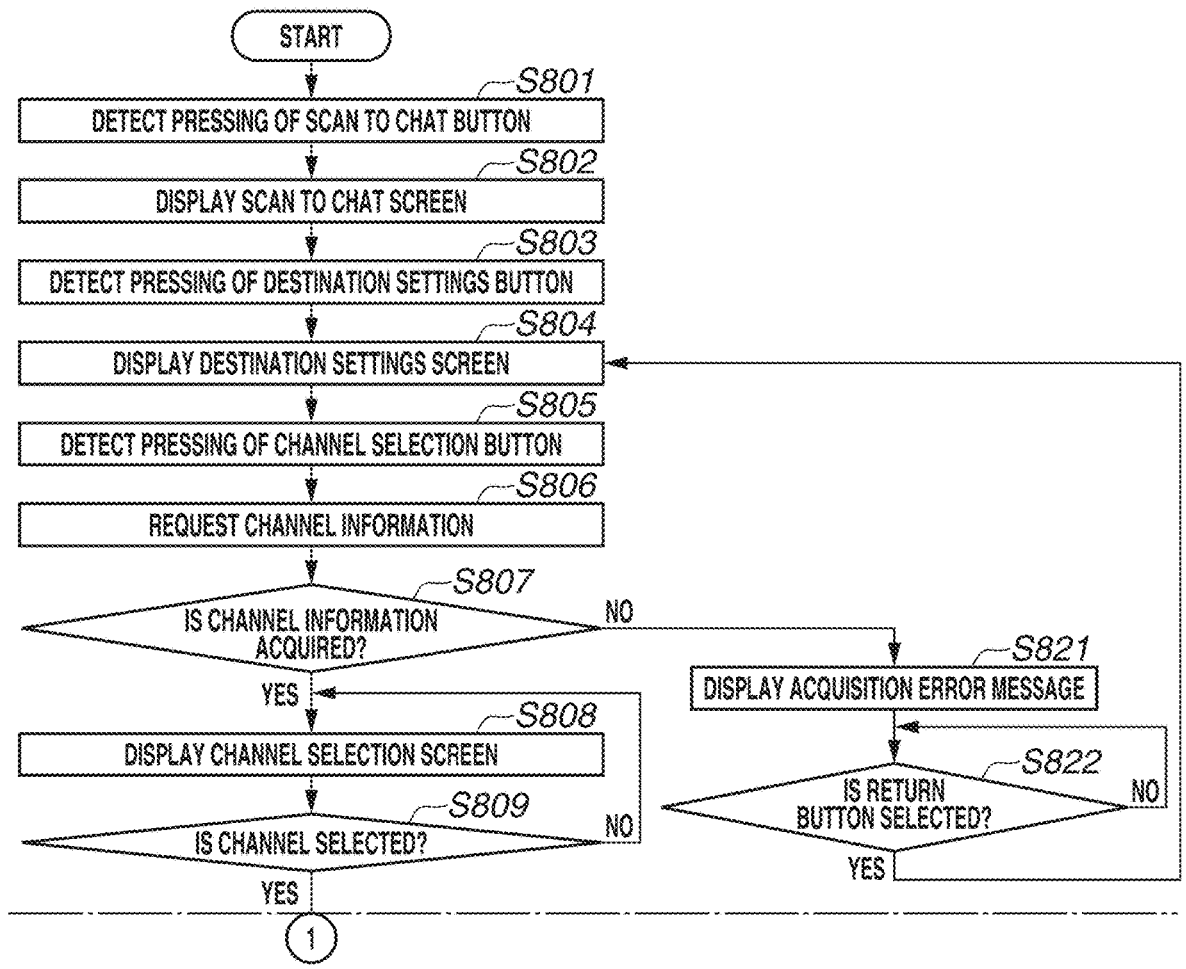
FIGS. 8A and 8B are a flowchart illustrating an example of scan-to-chat processing performed by the image processing apparatus.
Figure 8B:
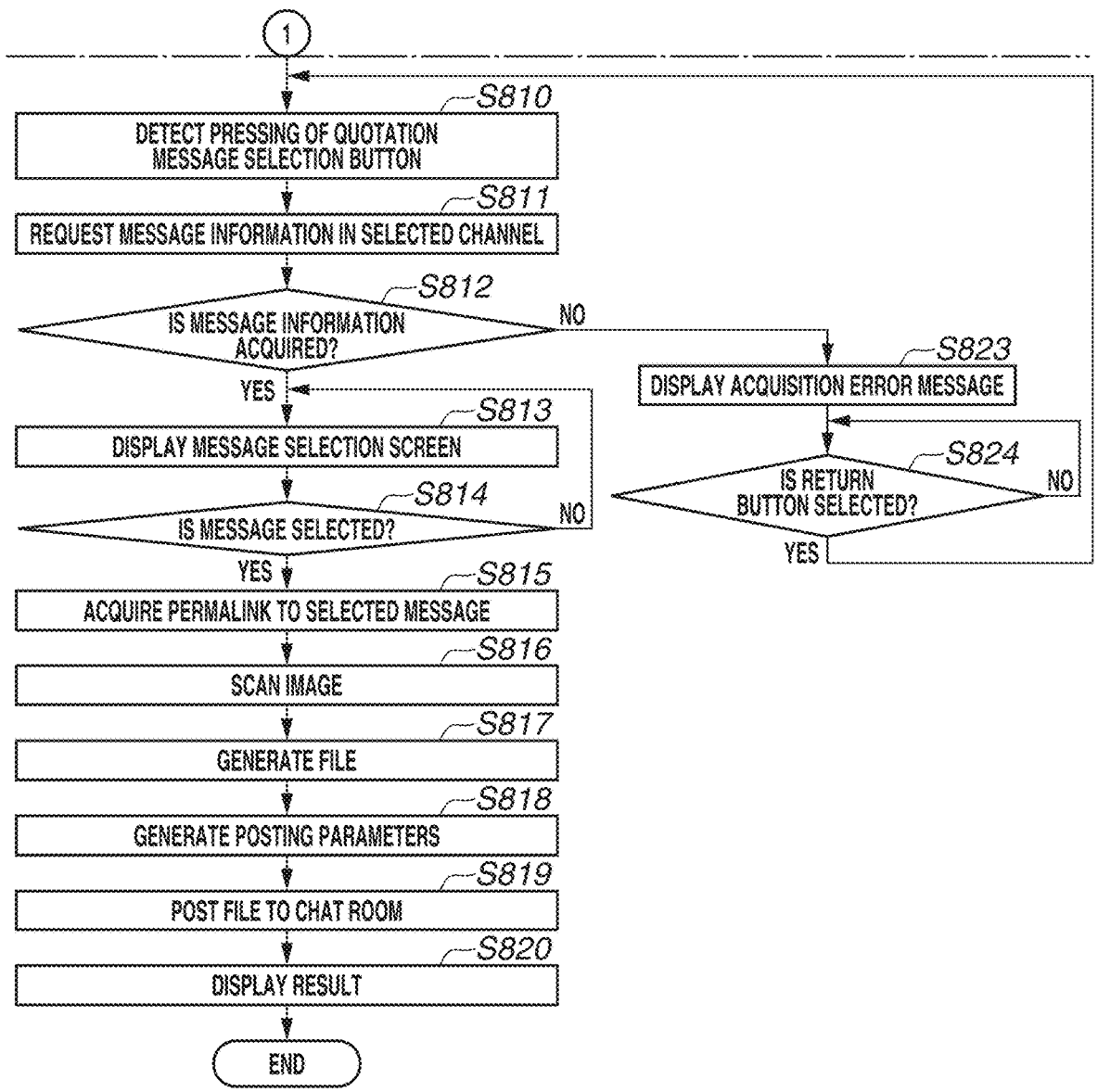

FIGS. 8A and 8B are a flowchart illustrating an example of the scan-to-chat processing performed by the image processing apparatus 101. The processing in the flowchart in FIGS. 8A and 8B is performed by the CPU 202 loading a program stored in the ROM 203 into the RAM 204 and executing the program. The flowchart in FIGS. 8A and 8B is started upon power-on of the image processing apparatus 101.

In step S801, when the CPU 202 detects selection of the SCAN TO CHAT button 602, the processing proceeds to step S802.

In step S802, the CPU 202 displays the SCAN TO CHAT screen 901 on the touch panel 601 of the operation unit 207. A screen transition after the selection of the SCAN TO CHAT button 602 will now be described with reference to FIGS. 9A and 9B.

FIGS. 9A and 9B is a diagram illustrating an example of a screen transition in the scan-to-chat processing. When the SCAN TO CHAT button 602 displayed on the HOME screen 608 is selected, the SCAN TO CHAT screen 901 is displayed on the touch panel 601 of the operation unit 207.

When a TRANSMISSION SETTINGS button 902 is selected on the SCAN TO CHAT screen 901, the TRANSMISSION SETTINGS screen 910 is displayed. On the TRANSMISSION SETTINGS screen 910, transmission settings such as the file format 911 can be changed and confirmed. In addition to the transmission settings, scan settings such as a reading size can be changed and confirmed. The user can also specify and input a message and a title to be used when image data is posted to a channel. The message and title specified and input on the TRANSMISSION SETTINGS screen 910 are transmitted to the message app server 400 in the processing of step S714 and posted together with the image data to the selected channel. In a case where a quotation message is set, both the quotation message and the message input through the operation unit 207 are posted. At this time, the quotation message is displayed so that the user can recognize that the message is quoted.

When the DESTINATION SETTINGS button 903 is selected, a DESTINATION SETTINGS screen 920 is displayed. On the DESTINATION SETTINGS screen 920, a CHANNEL SELECTION button 921 and a QUOTATION MESSAGE SELECTION button 922 can be selected.

When the CHANNEL SELECTION button 921 is selected, a CHANNEL SELECTION screen 930 is displayed.

Channels displayed on the CHANNEL SELECTION screen 930 are displayed based on channel list information received from the message app server 400 by the image processing apparatus 101. On the CHANNEL SELECTION screen 930, a posting destination channel can be selected. The user can also select a plurality of channels on the CHANNEL SELECTION screen 930. In this case, image data is posted to the selected plurality of channels.

If a return button 931 is selected, the content of the channel selection is stored, and the DESTINATION SETTINGS screen 920 is displayed again. At this time, the CHANNEL SELECTION button 921 displays "CHANNEL 3", which is the name of the channel selected as the posting destination.

When the QUOTATION MESSAGE SELECTION button 922 is selected, a list of messages in the channel selected on the CHANNEL SELECTION screen 930 is displayed on a MESSAGE SELECTION screen 940. These messages are acquired from the message app server 400 by the image processing apparatus 101. In FIG. 9B, each message is displayed so that the user name of a user who has posted the message and the content of the message can be viewed. Additionally, a configuration may be employed in which other information related to the message, such as a message ID or a timestamp, is displayed together with the message.

On the MESSAGE SELECTION screen 940, a message to be quoted (a message to which a reply is to be made) can be selected. The message to be quoted is not limited to a single message, and a plurality of messages can be selected. A list of messages is displayed after being sorted according to a particular rule specified using a sort button 942. In FIG. 9B, the list of messages is sorted so that the most recently posted message is displayed at the top, based on the times of the posting of the messages. Alternatively, the list of messages can be sorted according to another rule. For example, the list of messages can be sorted in chronological order, in priority order, or in alphabetical order of transmission user names. Yet alternatively, the list of messages may be sorted according to a combination of the above rules.

In the present exemplary embodiment, when a channel is selected, a message included in the channel can be selected. The present exemplary embodiment, however, is not limited thereto. For example, after a channel is selected, selection of a thread included in the channel may be received from the user, whereby only messages included in the selected thread may be displayed on the MESSAGE SELECTION screen 940.

The list of messages is displayed after being filtered according to a particular rule specified using a filter button

943. While "NO FILTER" is selected in FIG. 9B, for example, the list of messages may be filtered according to a rule such as displaying only messages posted at a particular date and time, displaying only messages transmitted by a particular user, or displaying only messages mentioning a particular user. As described above, based on message attribute information (e.g., a posting user, a date and time, and a mention), the image processing apparatus 101 can determine messages to be displayed as options from among messages received from the message app server 400.

If a return button 941 is selected in a state where a particular message is selected as a quotation message by the user, the content of the message selection is stored, and the DESTINATION SETTINGS screen 920 is displayed again. At this time, the QUOTATION MESSAGE SELECTION button 922 displays the content of the message to be quoted, "CAN YOU SEND ME THE MATERIAL?". If a plurality of messages is selected, the contents of the selected messages are displayed. If, however, the screen size is limited, the contents of the selected messages may be omitted.

While a configuration has been employed in which a channel and a quotation message are selected on different screens in the present exemplary embodiment, a configuration may be employed in which a list of messages is displayed on the CHANNEL SELECTION screen 930, and the user can select a channel and a message on the same screen. Alternatively, a configuration may be employed in which not a single channel and a single quotation message but a plurality of channels and a plurality of quotation messages can be selected. Further alternatively, a configuration may be employed in which additional other items such as user information for a mention can be further selected in addition to a channel and a quotation message. The term "mention" refers to the function of clarifying to whom a message is transmitted and prompting a recipient user to see the message. For example, examples of the mention include a method in which, when an at-symbol (@) is added to the user name of a user to whom a message is to be transmitted and a description of "@user name" is provided, a notification is transmitted to the specified user, and the character color of the user name changes, thereby enhancing visibility. In the present exemplary embodiment, a configuration may be employed in which, when a message to be quoted is selected on the MESSAGE SELECTION screen 940, user information regarding the posting user of the selected message is acquired and set as a user to be mentioned. In this case, in step S714, an instruction to request the mention of the user is further transmitted. In other words, when a message (a post) to which a reply is to be made is selected, a user having posted the message is automatically specified as a user to be mentioned, whereby it is possible to save the user the trouble of selecting a user to be mentioned.

Additionally, a configuration may be employed in which, if a channel is selected on the CHANNEL SELECTION screen 930, a list of users in the selected channel is displayed, and a user to be mentioned is selected from the list of users. If the user to be mentioned is selected as described above, the user name to be mentioned is displayed on the SCAN TO CHAT screen 901 or the TRANSMISSION SETTINGS screen 910.

When a RESET button 904 is selected on the SCAN TO CHAT screen 901, the set information is cleared. At this time, the set posting destination information is also cleared.

When a MONOCHROME: START button 905 or a COLOR: START button 906 is selected on the SCAN TO CHAT screen 901, scan-to-send processing is started.

The description returns to the flowchart in FIGS. 8A and 8B. In step S802, the CPU 202 displays the SCAN TO CHAT screen 901 in FIG. 9A on the operation unit 207.

In step S803, when the CPU 202 detects the selection of the DESTINATION SETTINGS button 903, then in step S804, the CPU 202 displays the DESTINATION SETTINGS screen 920.

In step S805, when the CPU 202 detects the pressing of the CHANNEL SELECTION button 921, then in step S806, the CPU 202 transmits a request for channel information to the message app server 400 through HTTP communication using pre-registered token information and user ID information.

Figure 10:
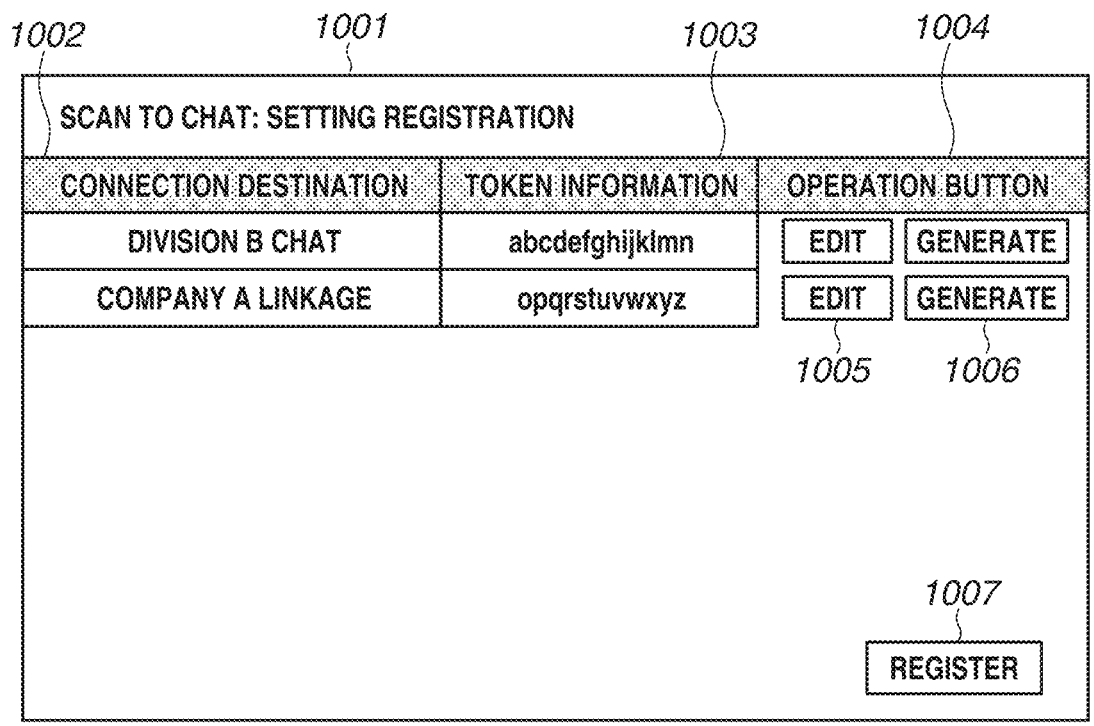
FIG. 10 is a diagram illustrating an example of a setting registration screen.

A setting registration screen will now be described with reference to FIG. 10. FIG. 10 is a diagram illustrating an example of the setting registration screen. The SETTING REGISTRATION screen 1001 is a screen displayed on the operation unit 207 of the image processing apparatus 101. Alternatively, the SETTING REGISTRATION screen 1001 may be displayed as a web page on an operation unit of an information processing apparatus, such as a PC, connected to the image processing apparatus 101 via the network 100. The content registered on the SETTING REGISTRATION screen 1001 is stored in the storage 205.

A CONNECTION DESTINATION column 1002 indicates organization information regarding a connection destination. A TOKEN INFORMATION column 1003 indicates registered token information. An OPERATION BUTTON column 1004 displays an EDIT button 1005 and a GENERATE button 1006 as operation buttons.

When the EDIT button 1005 is selected, character strings of token information and connection destination information can be entered and changed using a keyboard. When the GENERATE button 1006 is selected, the SCAN TO CHAT button 602 is set to be displayed on the HOME screen 608.

When a REGISTER button 1007 is pressed, the input of character strings by the user can be received, and the connection destination and the token information can be additionally registered.

The description returns to the flowchart in FIGS. 8A and 8B. In step S807, the CPU 202 determines whether channel information is acquired from the message app server 400 as a response to the channel information acquisition request transmitted in step S806. More specifically, if a status code in the response in HTTP communication is an error, or if body information in the response includes a parameter indicating that channel information is unable to be acquired, the CPU 202 determines that channel list information is not received.

If the CPU 202 determines that channel information is acquired (YES in step S807), the processing proceeds to step S808. If the CPU 202 determines that channel information is not acquired (NO in step S807), the processing proceeds to step S821.

In step S821, the CPU 202 displays, on the CHANNEL SELECTION screen 930, information indicating that channel list information fails to be acquired. At this time, the CHANNEL SELECTION screen 930 does not display channel options.

In step S822, the CPU 202 determines whether the return button 931 is selected.

If the CPU 202 determines that the return button 931 is selected (YES in step S822), the processing returns to step S804. If the CPU 202 determines that the return button 931 is not selected (NO in step S822), the processing returns to step S822.

In step S808, the CPU 202 displays, on the touch panel 601 of the operation unit 207, the CHANNEL SELECTION screen 930 displaying the channel information received from the message app server 400.

In step S809, the CPU 202 determines whether a channel is selected and determined by an operation performed on the CHANNEL SELECTION screen 930 through the touch panel 601 of the operation unit 207. If a channel is determined (YES in step S809), the processing proceeds to step S810. If a channel is not determined (NO in step S809), the processing returns to step S808.

In step S810, when the CPU 202 detects the pressing of the QUOTATION MESSAGE SELECTION button 922, the processing proceeds to step S811. In step S811, using channel information regarding the channel determined in step S809, the CPU 202 transmits a request for message information in the selected channel to the message app server 400 through HTTP communication.

In step S812, the CPU 202 determines whether the message information is received from the message app server 400 as a response to the message information acquisition request transmitted in step S811. If the CPU 202 determines that the message information is received (YES in step S812), the processing proceeds to step S813. If the CPU 202 determines that the message information is not received (NO in step S812), the processing proceeds to step S823.

In step S823, the CPU 202 displays, on the MESSAGE SELECTION screen 940, information indicating that the message information fails to be received. At this time, the MESSAGE SELECTION screen 940 does not display message options.

In step S824, the CPU 202 determines whether the return button 941 is selected.

If the CPU 202 determines that the return button 941 is selected (YES in step S824), the processing returns to step S810. If the CPU 202 determines that the return button 941 is not selected (NO in step S824), the processing returns to step S824.

In step S813, the CPU 202 displays, on the touch panel 601 of the operation unit 207, the MESSAGE SELECTION screen 940 displaying the message information received from the message app server 400.

In step S814, the CPU 202 determines whether a message is selected and determined by an operation performed on the MESSAGE SELECTION screen 940 through the touch panel 601 of the operation unit 207. If a message is determined (YES in step S814), the processing proceeds to step S815. If a message is not determined (NO in step S814), the processing returns to step S813.

In step S815, using identification information regarding the channel selected in step S809 and identification information regarding the message selected in step S814, the CPU 202 transmits a request for permalink information regarding a permalink to the message to be quoted to the message app server 400 through HTTP communication, and acquires the permalink information.

In step S816, when the MONOCHROME: START button 905 or the COLOR: START button 906 displayed on the operation unit 207 is selected, the CPU 202 controls the reading unit 209 based on scan settings to read an image of a document and generate image data. The scan settings are those specified by the user on the advanced settings screen (not illustrated) for the scan-to-chat processing, and the scan settings received from the message app server 400 are used.

In step S817, the CPU 202 converts the image data generated in step S816 into the file format 911 set on the TRANSMISSION SETTINGS screen 910. Alternatively, the processing of step S817 may be omitted.

In step S818, the CPU 202 generates posting parameters. The posting parameters include the posting destination channel, the file format, the file name, a posting comment, and the permalink to the message to be quoted. Additionally, information regarding a user to be mentioned may be included. As the file format, a file format corresponding to the file format 911 set on the TRANSMISSION SETTINGS screen 910 is set. The posting comment is a message set on the TRANSMISSION SETTINGS screen 910 by the user. The file name is a file name specified on the TRANSMISSION SETTINGS screen 910.

In step S819, using the pre-registered token information, the CPU 202 transmits the file and the posting parameters generated in step S818 to the message app server 400 using the POST method in HTTP communication. These pieces of data (the file generated by converting the image data and the posting parameters) are transmitted to the message app server 400, whereby the message app server 400 posts the file while quoting the selected message in the selected channel based on the posting parameters. The posting of the image file and the addition of information are performed by the message app server 400.

In step S820, the CPU 202 receives a result of the posting from the message app server 400 and displays the result on the touch panel 601 of the operation unit 207.

The above processing makes it possible to, when image data generated by scanning a document using a scanning apparatus is posted as a reply to a chat service, easily identify a post to which the reply is made.

While only a single piece of token information is assumed to be registered in the present exemplary embodiment, in a case where a plurality of pieces of token information is registered, the processing related to token information, i.e., the processing of steps S806, S811, S815, and S819 is performed as many times as the number of registered tokens.

Figure 11:
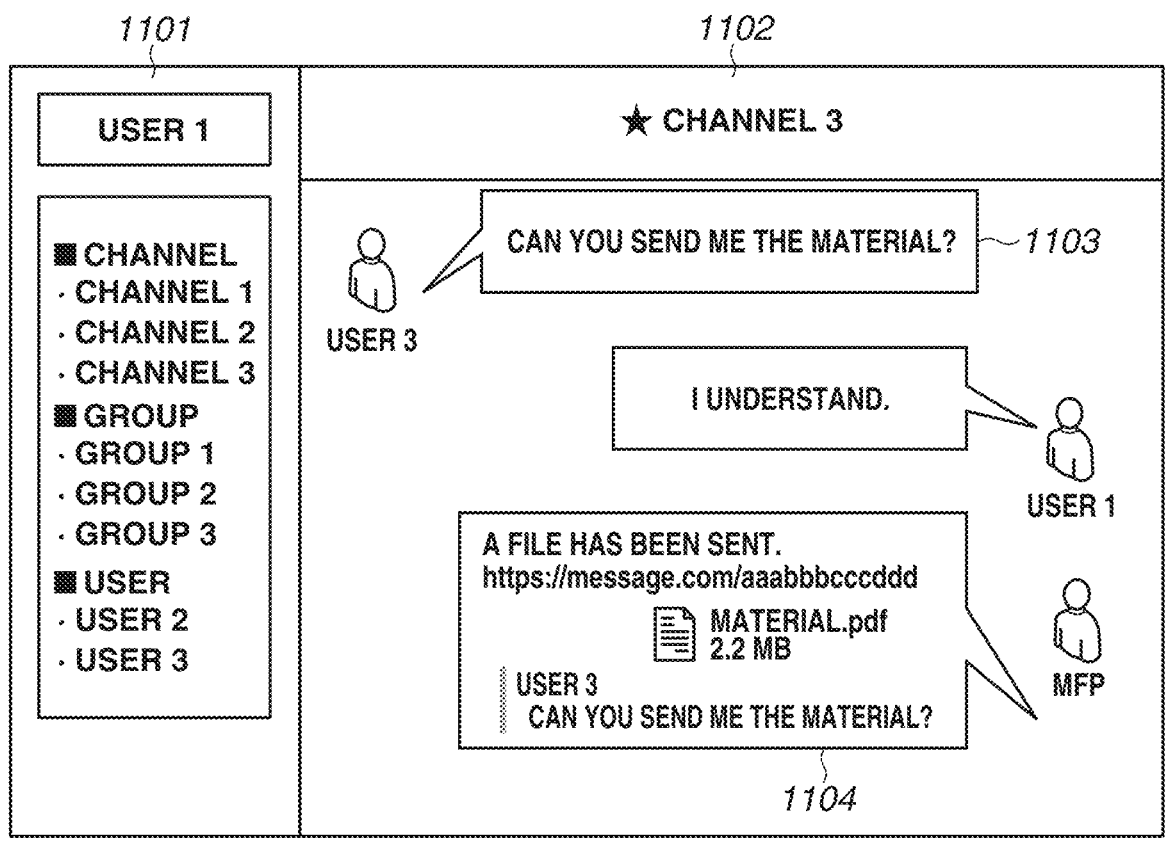
FIG. 11 is a diagram illustrating an example of a message screen of a message application.

With reference to FIG. 11, a description will be given of an example of a screen displayed on the operation panel 301 of the mobile terminal 300 by transmitting the file generated by converting the image data and the posting parameters to the message app server 400 in the processing of step S819.

FIG. 11 is a diagram illustrating an example of a message screen of the message app. A message screen 1101 in FIG. 11 is displayed when the message app is started on the mobile terminal 300 and the processing of step S819 is performed by the image processing apparatus 101. The mobile terminal 300 is communicating with the message app server 400.

The user starts the message app on the mobile terminal 300 and logs into the message app by inputting the user's account ID and password to the mobile terminal 300, whereby a screen dedicated to the user is displayed.

A message 1103 is a chat message displayed when a user having an account of a user 3 posts a message to a channel 3.

A message 1104 is displayed (posted) when a user having an account of a user 1 transmits an image file generated by a scan and posting parameters to the message app server 400 through the image processing apparatus 101 using a user ID of the user 1. In the example of FIG. 11, a channel name 1102, i.e., "CHANNEL 3" is selected as the posting destination channel in the posting parameters, "MATERIAL.pdf" is specified as the file name in the posting parameters, and "A FILE HAS BEEN SENT." is specified as the posting comment. The message 1103 "CAN YOU SEND ME THE MATERIAL?" is also selected as the quotation message. If a permalink to the message 1103 is specified, a user name as user information regarding the user 3 who has transmitted the message 1103, and a text portion of the message 1103 are posted in association with the image data in the message 1104. Also in a case where a plurality of quotation messages is selected on the MESSAGE SELECTION screen 940, similarly, each of the selected messages is described at the end of the message 1104. In the example of FIG. 11, a configuration has been described in which the permalink to the message 1103 is specified, whereby the message app server 400 displays and posts the quoted sentence at the end of the message 1104. The present exemplary embodiment, however, is not limited thereto. For example, a configuration may be employed in which not the permalink but a message ID or a timestamp is specified, whereby the message app server 400 associates the message ID or the timestamp with the quoted message and displays the quoted sentence. While the quoted sentence is displayed at the end of the message 1104, the quoted sentence may be displayed in any portion of the message 1104.

If image data or an image file generated by a scan is posted, as illustrated in the message 1104, an icon of the posted image data or image file is displayed in the message 1104. When the icon is selected by a user participating in the channel, the content of the file is displayed on the screen of a terminal of the user having selected the icon. The image data or image file to be posted to the channel may be the entity file of the image data or image file, or may be link information such as a URL for accessing the image data or image file. In a case where the link information is to be posted, when the image data is transmitted to the message app server 400, the message app server 400 stores the image data in a cloud storage service. The message app server 400 then acquires the link information for accessing the stored image data from the cloud storage service. The message app server 400 posts the acquired link information to a selected channel. Further, the image data to be posted is stored in a folder corresponding to the posting destination channel among folders managed by a folder function of the chat service. This folder can be referred to by only users participating in the posting destination channel.

In the first exemplary embodiment, an example has been described where the image processing apparatus 101 directly transmits an image file and posting parameters to the message app server 400. In a second exemplary embodiment, an example will be described where the image processing apparatus 101 transmits an image file and posting parameters to the message app server 400 via the bot server 500.

Figure 12:
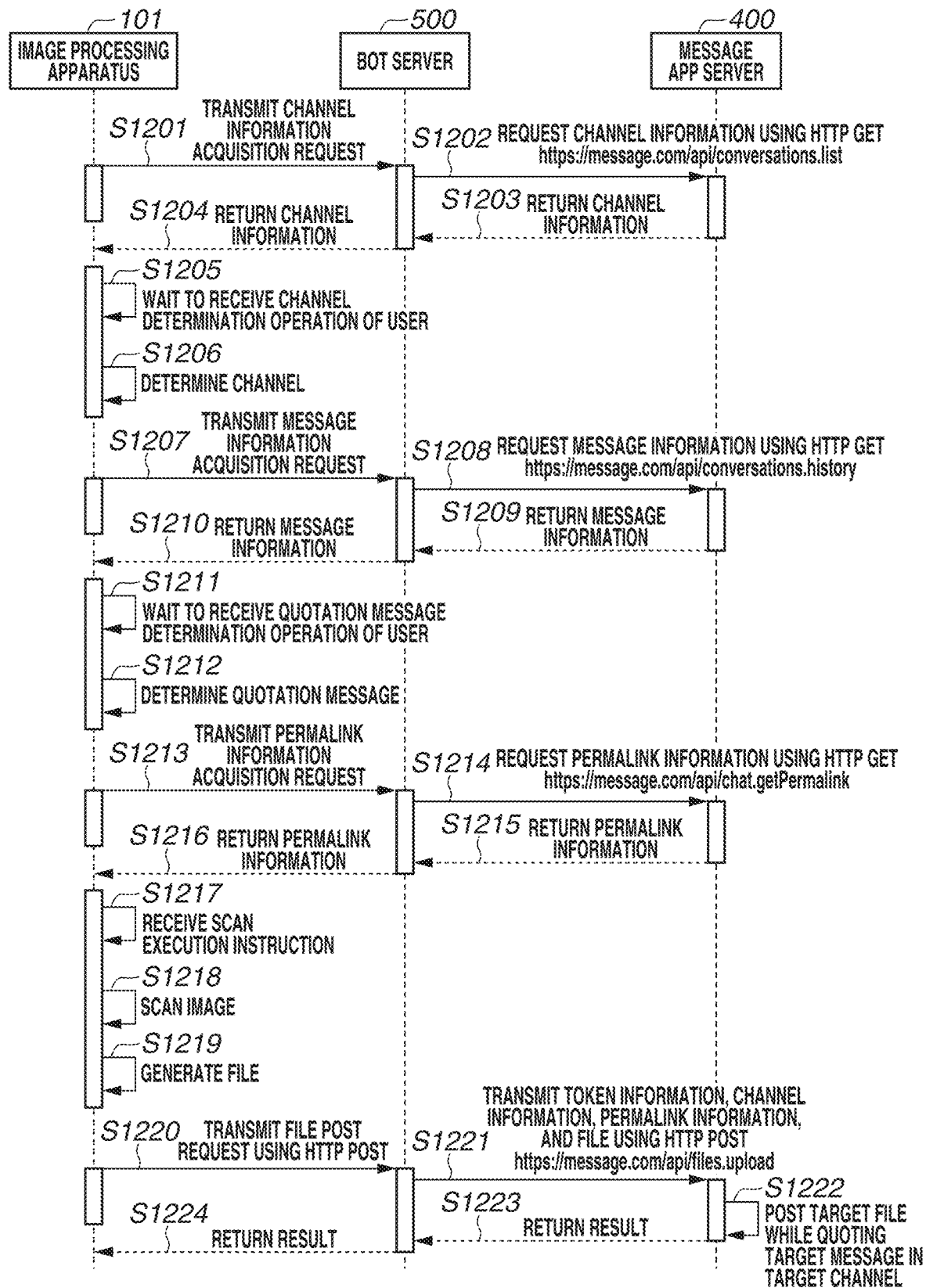
FIG. 12 is a diagram illustrating an example of a sequence where the image processing apparatus transmits a file generated by a scan to the message application server via the bot server.

FIG. 12 is a diagram illustrating an example of a sequence where the image processing apparatus 101 transmits a file generated by a scan to the message app server 400 via the bot server 500.

In step S1201, the CPU 202 of the image processing apparatus 101 transmits a channel information acquisition request to the bot server 500.

In step S1202, the CPU 501 of the bot server 500 transmits a request for channel information to the message app server 400 through HTTP communication. An example of a command transmitted at this time is "HTTP GET https://message.com/api/conversations.list". The token information is transmitted to this URL, whereby the message app server 400 searches for a channel associated with the work space corresponding to the token information and the user.

In step S1203, based on the received token information and user ID, the CPU 401 of the message app server 400 determines whether access to the URL is permitted. If access to the URL is permitted, the CPU 401 of the message app server 400 returns channel information included in the work space corresponding to the token information to the bot server 500.

In step S1204, the CPU 501 of the bot server 500 returns the channel information received from the message app server 400 to the image processing apparatus 101.

The processing of steps S1205 and S1206 is similar to the processing of steps S703 and S704 in FIG. 7, and thus will not be described.

In step S1207, based on channel information regarding the channel determined in step S1206, the CPU 202 of the image processing apparatus 101 transmits a request to acquire message information in the channel to the bot server 500.

In step S1208, the CPU 501 of the bot server 500 transmits a request for the message information in the channel specified by the image processing apparatus 101 to the message app server 400 through HTTP communication. An example of a command transmitted at this time is "HTTP GET https://message.com/api/conversations.history". The channel information is transmitted to this URL, whereby the message app server 400 searches for a message corresponding to the channel information.

In step S1209, the CPU 401 of the message app server 400 returns message information in the specified channel to the bot server 500.

In step S1210, the CPU 501 of the bot server 500 returns the message information received from the message app server 400 to the image processing apparatus 101.

The processing of steps S1211 and S1212 is similar to the processing of steps S707 and S708 in FIG. 7, and thus will not be described.

In step S1213, based on message information regarding the quotation message determined in step S1212, the CPU 202 of the image processing apparatus 101 transmits a request to acquire a permalink to the message to the bot server 500.

In step S1214, the CPU 501 of the bot server 500 transmits a request for the permalink to the message to the message app server 400 through HTTP communication. An example of a command transmitted at this time is "HTTP GET https://message.com/api/chat.getPermalink". A timestamp of the message is transmitted to this URL, whereby the message app server 400 searches for the permalink to the target message.

In step S1215, the CPU 401 of the message app server 400 returns the permalink to the target message to the bot server 500.

In step S1216, the CPU 501 of the bot server 500 returns the permalink to the target message that is received from the message app server 400 to the image processing apparatus 101.

The processing of steps S1217 to S1219 is similar to the processing of steps S711 to S713 in FIG. 7, and thus will not be described.

In step S1220, the CPU 202 of the image processing apparatus 101 transmits the same token information as that in step S1201 and the information regarding the posting destination channel selected in step S1206 to the bot server 500 via the communication unit 217. The CPU 202 of the image processing apparatus 101 further transmits permalink information regarding the permalink to the quotation message that is acquired in step S1216 and the image file generated in step S1219. As the file format, the file format 911 specified on the TRANSMISSION SETTINGS screen 910 for the scan-to-chat processing by the user is used.

In step S1221, the CPU 501 of the bot server 500 transmits a file upload request to the message app server 400 through HTTP communication. An example of a command transmitted at this time is "HTTP POST https://message.com/api/files.upload".

In step S1222, the CPU 401 of the message app server 400 searches for work space information registered in the token information received in step S1221 and stores the received image file and the channel specified by the channel information in association with each other. If the permalink to the quotation message is also received, the CPU 401 of the message app server 400 stores the received image file in association with the selected message in the posting destination channel. Consequently, when the user starts the message app on the mobile terminal 300 and selects the posting destination channel, a screen where the image file is posted while the selected message in the selected channel is quoted is displayed.

In step S1223, the CPU 401 of the message app server 400 returns, to the bot server 500, a result of whether the posting is successful as response information in HTTP communication.

In step S1224, the CPU 501 of the bot server 500 returns the file posting result received from the message app server 400 to the image processing apparatus 101.

If the posting is successful, the CPU 202 of the image processing apparatus 101 may display, on the operation unit 207, a notification that the posting is successful. If the posting fails, the CPU 202 of the image processing apparatus 101 may display, on the operation unit 207, a notification that the posting fails. Alternatively, if the posting is successful, the CPU 202 of the image processing apparatus 101 may display no notification, and only if the posting fails, the CPU 202 of the image processing apparatus 101 may display a notification that the posting fails.

Figure 13A:
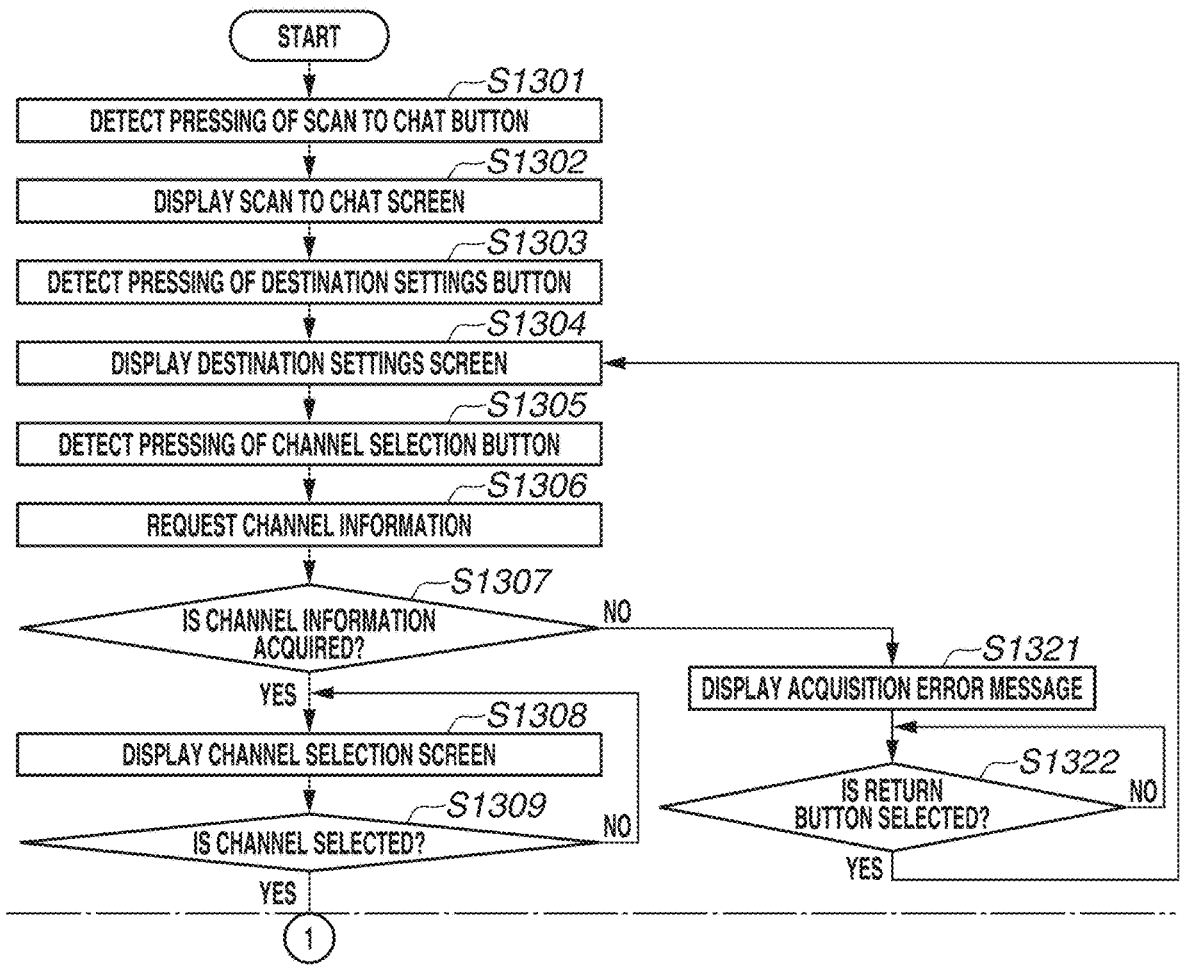
FIGS. 13A and 13B are a flowchart illustrating an example of processing where the image processing apparatus transmits a file generated by a scan to the message application server via the bot server.
Figure 13B:
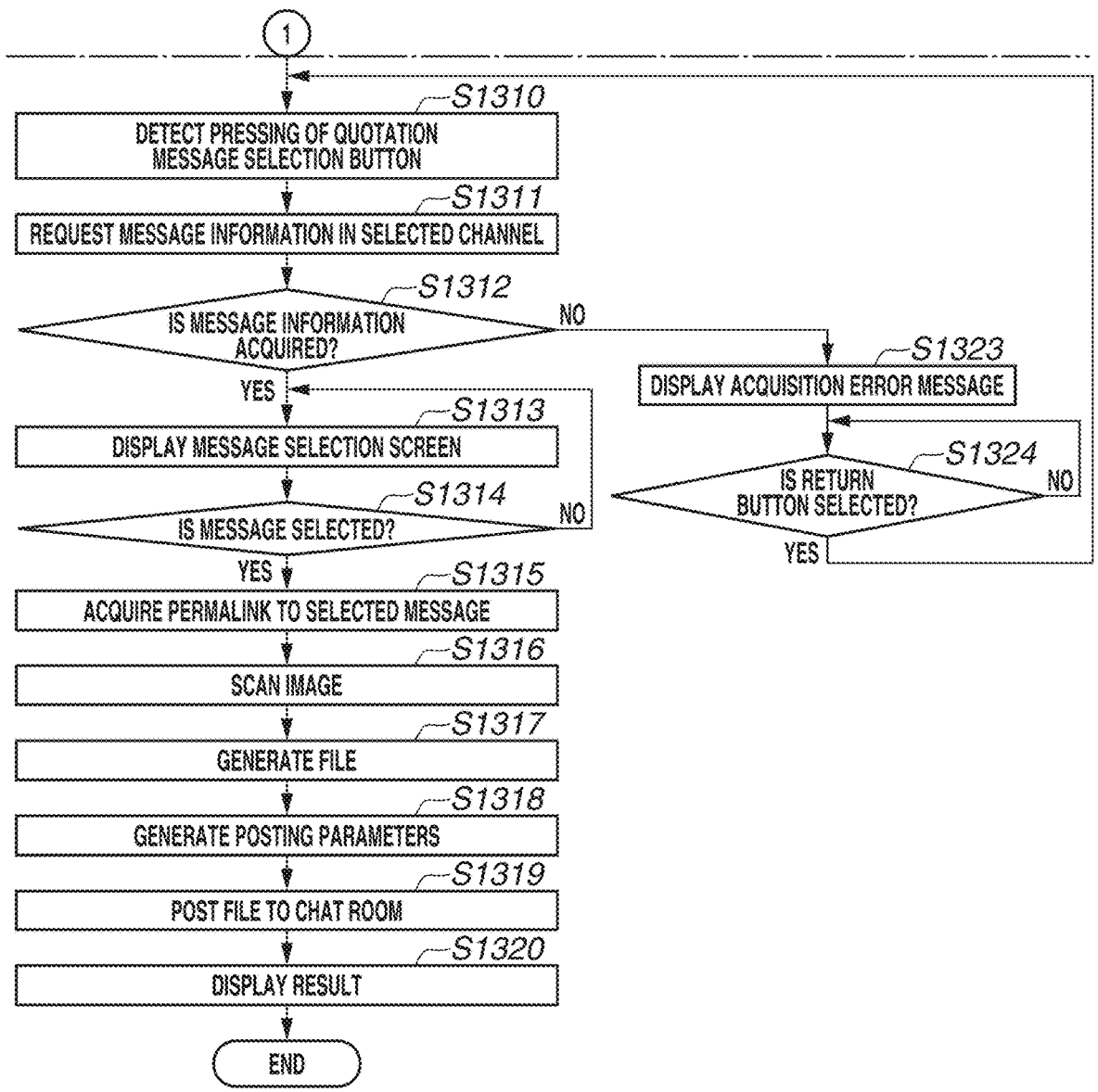

FIGS. 13A and 13B are a flowchart illustrating an example of the scan-to-chat processing performed by the image processing apparatus 101. The processing in the flowchart in FIGS. 13A and 13B is performed by the CPU 202 loading a program stored in the ROM 203 into the RAM 204 and executing the program. The flowchart in FIGS. 13A and 13B is started upon power-on of the image processing apparatus 101.

The processing of steps S1301 to S1305 is similar to the processing of steps S801 to S805, and thus will not be described.

In step S1306, the CPU 202 acquires a user ID of the user having logged into the image processing apparatus 101 or a device ID of the image processing apparatus 101 and transmits a channel information acquisition request and the user ID or the device ID to the bot server 500.

The processing of steps S1307 to S1310 is similar to the processing of steps S807 to S810, and thus will not be described.

In step S1311, based on the user ID of the user having logged into the image processing apparatus 101 or the device ID of the image processing apparatus 101 and channel information regarding the channel determined in step S1309, the CPU 202 transmits a request to acquire message information in the channel to the bot server 500.

The processing of steps S1312 to S1314 is similar to the processing of steps S812 to S814, and thus will not be described.

In step S1315, based on the channel information regarding the channel determined in step S1309 and message information regarding the message determined in step S1314, the CPU 202 transmits a request to acquire permalink information regarding a permalink to the message to the bot server 500.

The processing of steps S1316 to S1318 is similar to the processing of steps S816 to S818, and thus will not be described.

In step S1319, the CPU 202 of the image processing apparatus 101 transmits the file generated in step S1317 and the posting parameters generated in step S1318 to the bot server 500.

The processing of steps S1320 to S1324 is similar to the processing of steps S820 to S824, and thus will not be described.

While the user ID of the logged-in user or the device ID is used for communication with the bot server 500 in the present exemplary embodiment, a tenant ID can also be used as long as the tenant ID is a uniquely determined identifier.

Figure 14:
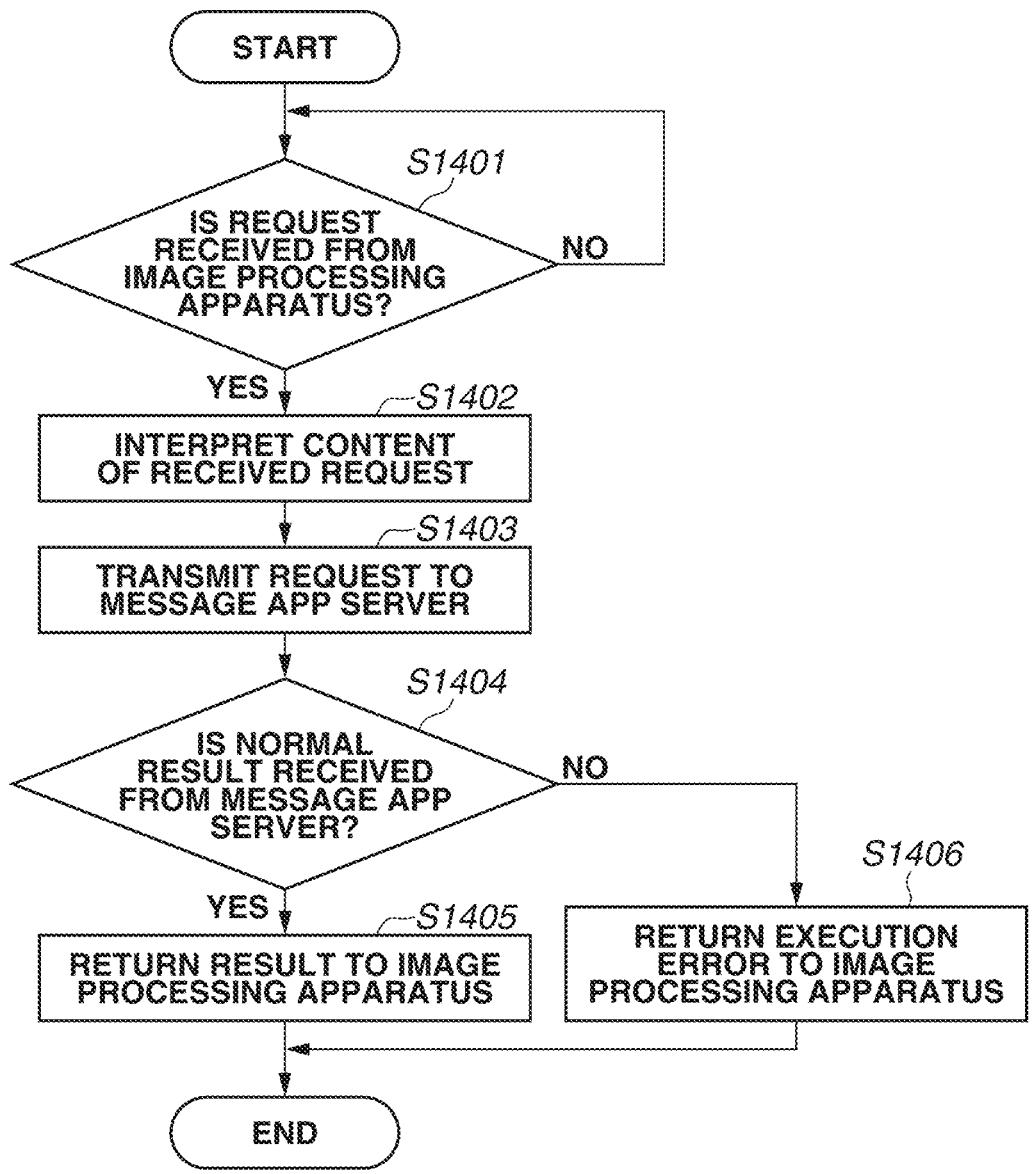
FIG. 14 is a flowchart illustrating an example of processing in a case where the bot server transmits a request from the image processing apparatus to the message application server.

FIG. 14 is a flowchart illustrating an example of processing performed in a case where the bot server 500 transmits a request from the image processing apparatus 101 to the message app server 400. The processing in the flowchart in FIG. 14 is performed by the CPU 501 loading a program stored in the ROM 502 into the RAM 503 and executing the program.

In step S1401, the CPU 501 determines whether a request is received from the CPU 202 of the image processing apparatus 101. If the CPU 501 determines that a request is received from the CPU 202 (YES in step S1401), the processing proceeds to step S1402. If the CPU 501 determines that a request is not received from the CPU 202 (NO in step S1401), the processing returns to step S1401.

In step S1402, the CPU 501 of the bot server 500 interprets the content of the request received from the image processing apparatus 101.

In step S1403, the CPU 501 of the bot server 500 transmits the request interpreted in step S1402 to the message app server 400.

In step S1404, the CPU 501 of the bot server 500 determines whether a normal result is received as a response to the request transmitted to the message app server 400 in step S1403. If a normal result (response) is received (YES in step S1404), the processing proceeds to step S1405. If a normal result (response) is not received (NO in step S1404), the processing proceeds to step S1406.

In step S1405, the CPU 501 of the bot server 500 returns the result (the response) from the message app server 400 to the image processing apparatus 101.

In step S1406, the CPU 501 of the bot server 500 returns an execution error to the image processing apparatus 101.

According to the present exemplary embodiment, even in a case where the interface specifications of the message app server 400 are changed, it is possible to implement the scan-to-chat processing simply by updating a program for the bot server 500 without uploading a program for the image processing apparatus 101. Moreover, in a workplace where the plurality of image processing apparatuses 101 is present, it is possible to post a file without setting a token individually for each of the image processing apparatuses 101.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-137475, filed Aug. 31, 2022, which is hereby incorporated by reference herein in its entirety.

What is claimed is:

1. A scanning apparatus comprising:
a scanning unit configured to scan a document to generate image data; and
a transmission unit configured to transmit, to a chat server, the image data generated by the scanning unit and identification information corresponding to a post selected as a post to which a reply is to be made,
wherein the image data transmitted by the transmission unit and the post corresponding to the identification information transmitted by the transmission unit are posted in association with each other to a talk room of a chat service provided by the chat server.

2. The scanning apparatus according to claim 1, wherein a post including the image data transmitted by the transmission unit and the post corresponding to the identification information transmitted by the transmission unit is posted to the talk room.

3. The scanning apparatus according to claim 1, further comprising a reception unit configured to receive selection of the talk room of the chat service,
wherein the transmission unit transmits, to the chat server, the image data, the identification information, and information regarding the selected talk room, and
wherein the image data transmitted by the transmission unit and the post corresponding to the identification information transmitted by the transmission unit are posted in association with each other to the selected talk room.

4. The scanning apparatus according to claim 3, wherein the reception unit receives selection of the post to which the reply is to be made from among posts included in the selected talk room.

5. The scanning apparatus according to claim 4,
wherein the reception unit receives selection of a thread included in the selected talk room, and
wherein the reception unit receives the selection of the post to which the reply is to be made from among posts included in the selected thread.

6. The scanning apparatus according to claim 1, wherein the image data transmitted by the transmission unit is posted to the talk room in association with information indicating that the post corresponding to the identification information transmitted by the transmission unit is quoted.

7. The scanning apparatus according to claim 6, wherein a post including the image data transmitted by the transmission unit and the information indicating that the post corresponding to the identification information transmitted by the transmission unit is quoted is posted to the talk room.

8. The scanning apparatus according to claim 3, wherein the reception unit receives selection of the post to which the reply is to be made from among posts filtered based on message attribute information.

9. The scanning apparatus according to claim 3, wherein in a case where the reception unit receives selection of a plurality of posts to which the reply is to be made, the selected plurality of posts are posted in association with the image data.

10. The scanning apparatus according to claim 1, wherein information regarding a posting user of the selected post is posted in association with the image data.

11. The scanning apparatus according to claim 3, further comprising a display unit,
wherein the reception unit receives selection of the post to which the reply is to be made from among posts displayed on the display unit.

12. An image processing method comprising:
scanning a document to generate image data; and
transmitting, to a chat server, the generated image data and identification information corresponding to a post selected as a post to which a reply is to be made,
wherein the transmitted image data and the post corresponding to the transmitted identification information are posted in association with each other to a talk room of a chat service provided by the chat server.

13. A non-transitory computer-readable storage medium storing a program for causing a computer to perform an image processing method comprising:
scanning a document to generate image data; and
transmitting, to a chat server, the generated image data and identification information corresponding to a post selected as a post to which a reply is to be made,
wherein the transmitted image data and the post corresponding to the transmitted identification information are posted in association with each other to a talk room of a chat service provided by the chat server.

* * * * *